United States Patent
Liu et al.

(10) Patent No.: US 12,556,365 B2
(45) Date of Patent: Feb. 17, 2026

(54) DATA PROCESSING METHODS AND APPARATUSES BASED ON BLOCKCHAIN, ELECTRONIC DEVICE, COMPUTER-READABLE STORAGE MEDIUM, AND COMPUTER PROGRAM PRODUCT

(71) Applicant: TENCENT TECHNOLOGY (SHENZHEN) COMPANY LIMITED, Shenzhen (CN)

(72) Inventors: Qucheng Liu, Shenzhen (CN); Rui Guo, Shenzhen (CN); Jun Liang, Shenzhen (CN); Like Shu, Shenzhen (CN); Zongyou Wang, Shenzhen (CN); Hu Lan, Shenzhen (CN); Yang Lu, Shenzhen (CN); Hanqing Liu, Shenzhen (CN); Jun Li, Shenzhen (CN); Hui Zhang, Shenzhen (CN); Gengliang Zhu, Shenzhen (CN); Kaixuan Nie, Shenzhen (CN); Yifang Shi, Shenzhen (CN); Zhiyong Liao, Shenzhen (CN); Yangjun Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 147 days.

(21) Appl. No.: 18/528,133

(22) Filed: Dec. 4, 2023

(65) Prior Publication Data
US 2024/0129108 A1     Apr. 18, 2024

Related U.S. Application Data

(63) Continuation of application No. PCT/CN2023/111968, filed on Aug. 9, 2023.

(30) Foreign Application Priority Data

Oct. 14, 2022  (CN) .......................... 202211259133.1

(51) Int. Cl.
*H04L 9/06*       (2006.01)
*H04L 9/00*       (2022.01)
(Continued)

(52) U.S. Cl.
CPC .......... *H04L 9/0618* (2013.01); *H04L 9/0869* (2013.01); *H04L 9/3073* (2013.01); *H04L 9/50* (2022.05)

(58) Field of Classification Search
CPC ... H04L 63/1441; H04L 51/046; H04L 51/12; H04L 63/0254; H04L 63/0281;
(Continued)

(56) References Cited

U.S. PATENT DOCUMENTS 7,204,428 B2 * 4/2007 Wilson ................ G06V 10/245
                                                                235/494
7,537,877 B2 * 5/2009 Yoshiba ............... G03G 9/0812
                                                                430/108.7
(Continued)

FOREIGN PATENT DOCUMENTS

CN       109104413 A     12/2018
CN       112217639 A      1/2021
(Continued)

OTHER PUBLICATIONS

The World Intellectual Property Organization (WIPO) International Search Report for PCT/CN2023/111968 Oct. 24, 2023 7 Pages (including translation).

*Primary Examiner* — Sharif E Ullah
(74) *Attorney, Agent, or Firm* — Anova Law Group, PLLC

(57) ABSTRACT

A data processing method performed by a first device includes: generating, in response to first service data satis-
(Continued)

fying a data uploading condition, a first bit array corresponding to the first service data; encrypting the first bit array through a data key to obtain a ciphertext bit array, the data key being generated by a second device in a data intersection application run in a trusted execution environment of the second device; and transmitting the ciphertext bit array to a blockchain node for forwarding to a second device, for the second device to decrypt, in the data intersection application through the data key, the ciphertext bit array to obtain the first bit array.

19 Claims, 19 Drawing Sheets

(51) Int. Cl.
  *H04L 9/08* (2006.01)
  *H04L 9/30* (2006.01)
(58) Field of Classification Search
  CPC . H04L 63/1433; H04L 63/20; H04L 63/1425;
      H04L 63/08; H04L 63/101; H04L 63/105;
      H04L 63/145; H04L 12/4625; H04L
      2463/144; H04L 63/0236; H04L 9/088;
      H04L 9/30; H04L 9/0618; G06F 21/6245;
      G06F 16/9535; G06F 21/45; G06F
      21/552; G06F 21/577; G06F 21/604;
      G06F 21/64; G06F 2221/2129; H04W
      12/02; H04W 12/03; H04W 12/04; H04W
      12/08; H04W 12/71; H04W 84/12
  USPC ......... 380/30, 255, 264, 276; 726/2, 21, 36;
                                    713/150, 163, 181
  See application file for complete search history.

(56) References Cited

U.S. PATENT DOCUMENTS

| | | | | |
|---|---|---|---|---|
| 7,773,749 | B1* | 8/2010 | Durst .................. | G06K 19/086 |
| | | | | 380/54 |
| 8,851,372 | B2* | 10/2014 | Zhou .................... | H04B 1/385 |
| | | | | 455/66.1 |
| 9,239,414 | B2* | 1/2016 | Rey ...................... | B44C 1/04 |
| 9,269,576 | B2* | 2/2016 | Yamauchi ............ | H01L 23/544 |
| 10,281,398 | B2* | 5/2019 | Zheng .................. | G01N 21/553 |
| 10,412,107 | B2* | 9/2019 | Brutzkus ............. | H04L 63/1425 |
| 10,471,478 | B2* | 11/2019 | Gil ...................... | B07C 3/14 |
| 10,603,685 | B2* | 3/2020 | Zheng .................. | C23C 26/00 |
| 10,620,121 | B2* | 4/2020 | Zheng .................. | G01N 15/14 |
| 10,878,108 | B1* | 12/2020 | Nicolas ................ | G06F 21/602 |
| 11,484,011 | B2* | 11/2022 | Chapman ............. | A01K 27/006 |
| 11,488,122 | B2* | 11/2022 | Diamond .............. | G06Q 20/10 |

| | | | | |
|---|---|---|---|---|
| 2003/0120613 | A1* | 6/2003 | Neogi ................. | G06Q 20/401 |
| | | | | 705/75 |
| 2004/0112087 | A1* | 6/2004 | Bishop ................ | G09F 3/00 |
| | | | | 63/32 |
| 2010/0018955 | A1* | 1/2010 | Martinez ............. | G11B 7/1378 |
| | | | | 219/121.68 |
| 2010/0310839 | A1* | 12/2010 | Rey .................... | B44C 1/04 |
| | | | | 216/33 |
| 2012/0120465 | A1* | 5/2012 | Martinez ............. | G03H 1/08 |
| | | | | 219/121.2 |
| 2012/0167210 | A1* | 6/2012 | Oro Garcia .......... | H04L 63/101 |
| | | | | 726/22 |
| 2013/0117225 | A1* | 5/2013 | Dalton ................ | G06F 16/119 |
| | | | | 707/623 |
| 2015/0213734 | A1* | 7/2015 | Glickman ............ | G09F 3/005 |
| | | | | 235/494 |
| 2016/0099852 | A1* | 4/2016 | Cook .................. | H04L 47/2425 |
| | | | | 709/224 |
| 2016/0275585 | A1* | 9/2016 | Scoggins ............. | G06Q 30/0621 |
| 2016/0300234 | A1* | 10/2016 | Moss-Pultz .......... | H04L 9/3247 |
| 2018/0109494 | A1* | 4/2018 | Yu ...................... | H04L 63/1441 |
| 2018/0293474 | A1* | 10/2018 | Almog ................ | G09C 5/00 |
| 2018/0349621 | A1* | 12/2018 | Schvey ................ | H04L 9/3236 |
| 2019/0114698 | A1* | 4/2019 | Lutnick ............... | G06Q 30/0601 |
| 2019/0130100 | A1* | 5/2019 | Dymshits ............ | G06F 16/90335 |
| 2019/0173666 | A1* | 6/2019 | Ardashev ............ | H04L 9/3239 |
| 2019/0349733 | A1* | 11/2019 | Nolan ................. | H04L 45/20 |
| 2019/0355037 | A1* | 11/2019 | Desai .................. | G06F 16/955 |
| 2019/0378145 | A1* | 12/2019 | Mayer ................ | G06F 40/40 |
| 2020/0076786 | A1* | 3/2020 | Spivack .............. | B42D 25/328 |
| 2020/0137082 | A1* | 4/2020 | Jimenez-Delgado ....................... |
| | | | | H04L 9/0643 |
| 2020/0145454 | A1* | 5/2020 | Galliano ............. | H04L 61/4511 |
| 2020/0204346 | A1* | 6/2020 | Trevethan ........... | H04L 9/3218 |
| 2020/0246681 | A1* | 8/2020 | Chen .................. | G06K 7/1408 |
| 2020/0403776 | A1* | 12/2020 | Oh ...................... | H04L 9/3247 |
| 2021/0027447 | A1* | 1/2021 | Parikh ................. | G06F 18/22 |
| 2021/0091934 | A1* | 3/2021 | Fletcher .............. | H04L 9/0847 |
| 2021/0160235 | A1* | 5/2021 | Lerner ................ | H04L 9/0866 |
| 2021/0287288 | A1* | 9/2021 | Madisetti ............ | H04L 9/14 |
| 2021/0358004 | A1* | 11/2021 | Chang ................ | G06Q 30/0621 |
| 2021/0390531 | A1* | 12/2021 | Voorhees ............ | G06Q 20/367 |
| 2022/0027970 | A1* | 1/2022 | Kim .................... | G06Q 30/0613 |
| 2022/0254174 | A1* | 8/2022 | Hong .................. | G06V 10/758 |
| 2023/0016065 | A1* | 1/2023 | Diamond ............. | G06Q 30/06 |
| 2023/0086191 | A1* | 3/2023 | Jakobsson ........... | H04L 9/3231 |
| | | | | 705/66 |
| 2024/0129108 | A1* | 4/2024 | Liu ..................... | H04L 9/0618 |
| 2024/0340354 | A1* | 10/2024 | Wakabayashi ....... | H04L 67/12 |
| 2025/0211297 | A1* | 6/2025 | Gao .................... | H04B 7/0486 |
| 2025/0212284 | A1* | 6/2025 | Yue .................... | H04W 76/20 |

FOREIGN PATENT DOCUMENTS

| | | |
|---|---|---|
| CN | 113343305 A | 9/2021 |
| CN | 113395159 A | 9/2021 |
| CN | 114444124 A | 5/2022 |

\* cited by examiner

DATA PROCESSING METHODS AND APPARATUSES BASED ON BLOCKCHAIN, ELECTRONIC DEVICE, COMPUTER-READABLE STORAGE MEDIUM, AND COMPUTER PROGRAM PRODUCT

CROSS-REFERENCE TO RELATED APPLICATIONS

This application is a continuation of International Application No. PCT/CN2023/111968, filed on Aug. 9, 2023, which is claims priority to Chinese Patent Application No. 202211259133.1 filed on Oct. 14, 2022, which are incorporated by reference in their entirety.

FIELD OF THE TECHNOLOGY

This application relates to the field of Internet technologies, and in particular, to data processing methods and apparatuses based on blockchain, an electronic device, a computer-readable storage medium, and a computer program product.

BACKGROUND OF THE DISCLOSURE

With the rapid development of mobile Internet technology and various emerging technologies, platform applications have become more popular. With the emergence of a large number of platform applications, users have a wider range of choices. In order to increase active retention, the platform applications need to continuously promote their own platforms.

In the related technology, the platform applications collaborate with advertisers with strong platform promotion abilities to promote themselves. Specifically, a platform application provides its first service data to an advertiser, and the advertiser determines common service data, namely, service intersection data, between second service data of the advertiser and the first service data, and then performs promotion processing related to the service intersection data. Apparently, the related technology has the following drawbacks: 1. The platform application transmits its original data (namely, the first service data) to the advertiser, thereby reducing the security of the data. 2. Direct data transfer between the platform application and the advertiser makes it difficult to accurately trace a data obtaining state.

SUMMARY

In accordance with the disclosure, there is provided a data processing method performed by a first device and including: generating, in response to first service data satisfying a data uploading condition, a first bit array corresponding to the first service data; encrypting the first bit array through a data key to obtain a ciphertext bit array, the data key being generated by a second device in a data intersection application run in a trusted execution environment of the second device; and transmitting the ciphertext bit array to a blockchain node to enable the blockchain node to store and forward the ciphertext bit array to the second device for the second device to decrypt, in the data intersection application through the data key, the ciphertext bit array to obtain the first bit array.

Also in accordance with the disclosure, there is provided an electronic device included in a first device and including one or more processors and one or more memories storing at least one computer program. The at least one computer program, when executed by the one or more processors, causes the one or more processors to: generate, in response to first service data satisfying a data uploading condition, a first bit array corresponding to the first service data; encrypt the first bit array through a data key to obtain a ciphertext bit array, the data key being generated by a second device in a data intersection application run in a trusted execution environment of the second device; and transmit the ciphertext bit array to a blockchain node to enable the blockchain node to store and forward the ciphertext bit array to the second device for the second device to decrypt, in the data intersection application through the data key, the ciphertext bit array to obtain the first bit array.

Also in accordance with the disclosure, there is provided a data processing method performed by a second device and including generating a data key in a data intersection application run in a trusted execution environment of the second device; obtaining a ciphertext bit array forwarded by a blockchain node; decrypting, in the data intersection application and through the data key, the ciphertext bit array to obtain a first bit array; in the data intersection application, generating a second bit array, and determining service intersection data between first service data corresponding to the first bit array and second service data corresponding to the second bit array according to the second bit array and the first bit array; and performing service processing on the service intersection data.

BRIEF DESCRIPTION OF THE DRAWINGS

To describe the technical solutions in the embodiments of this application or in the related art more clearly, the following briefly introduces the accompanying drawings for describing the embodiments or the related art. Apparently, the accompanying drawings in the following description show merely some embodiments of this application.

DESCRIPTION OF EMBODIMENTS

Figure 1:
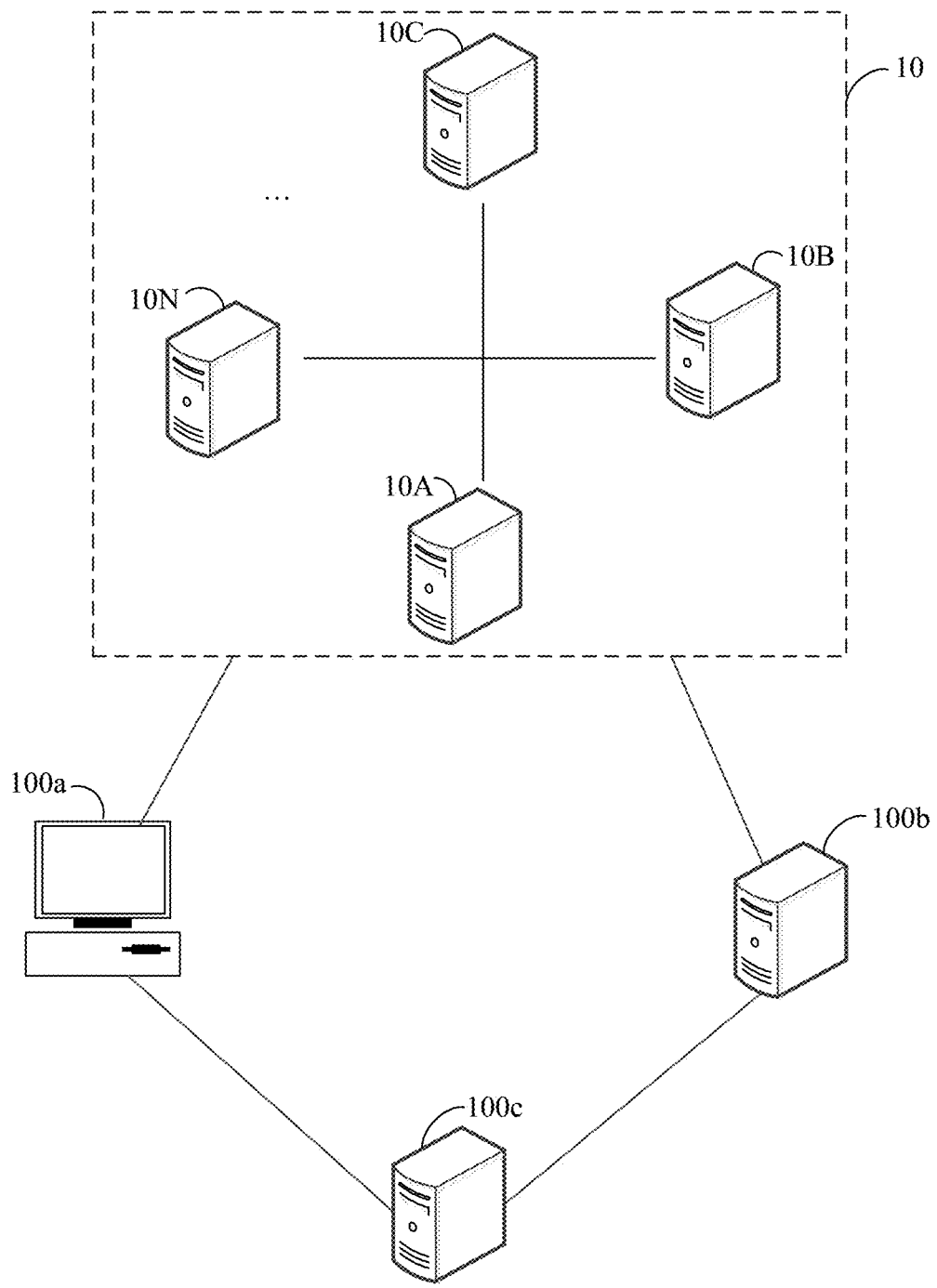
FIG. 1 is a schematic diagram of a system architecture according to an embodiment of this application.

The technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

For ease of understanding, some nouns are first explained simply below:

1. Blockchain: Blockchain is a linked data structure taking a block as a basic unit. In a block, a digital abstract is used to verify a previously obtained transaction history. It is suitable for the requirements of tamper resistance and scalability in a distributed accounting scenario. Blockchain also refers to a distributed accounting technology implemented by a blockchain structure, including distributed consensus, privacy and security protection, a peer to peer communication technology, a network protocol, a smart contract, and the like. The goal of the blockchain is to achieve a distributed data record ledger. This ledger can only be added and not deleted. A basic structure of a bottom layer of the ledger is a linear linked list. The linked list is composed of concatenated "blocks", and a subsequent block records a hash value of a previous block. Whether each block (and transactions in the block) is valid can be quickly verified by calculating a hash value. If a node in a network sends a request for adding a new block, a consensus mechanism needs to reach a consensus for confirmation.

2. Hash value: It is also referred to as an information feature value or a feature value. The hash value is generated by using a hash algorithm to convert inputted data with any length into a password and perform fixed outputting. Original inputted data cannot be retrieved by decrypting a hash value. The hash value is a one-way encryption function. In a blockchain, each block (except for an initial block) contains a hash value of a previous block. The hash value is a potential core foundation and the most important aspect of a blockchain technology, which maintains the authenticity of recording and viewing data, as well as the integrity of the blockchain as a whole.

3. Blockchain node: A blockchain network divides nodes into consensus nodes (also referred to as core nodes) and synchronous nodes (which can include data nodes and light nodes). The consensus nodes are responsible for the consensus services of the entire blockchain network. The synchronous nodes are responsible for synchronizing ledger information of the consensus nodes, that is, synchronizing the latest block data. Whether it is a consensus node or a synchronous node, its internal structure includes a network communication component. Because a blockchain network is essentially a peer to peer (P2P) network that requires communication with other nodes in the blockchain network through a P2P component. Resources and services in the blockchain network are scattered on various nodes, and transmission of information and implementation of services are directly carried out between the nodes, without intermediate links or a centralized server (a third party).

4. Public key and private key: A public key and a private key form a key pair (namely, a public key and a private key) obtained through an algorithm. The public key is a public part in the key pair, and the private key is a private part in the key pair. The public key is usually used for encrypting data, verifying a digital signature, and the like. This algorithm ensures that the obtained key pair is unique. When this key pair is used, if one key is used to encrypt a piece of data, the other key needs to be used to decrypt the data. For example, if data is encrypted with the public key, the encrypted data needs to be decrypted with the private key. If data is encrypted with the private key, the encrypted data needs to be decrypted with the public key, otherwise, the decryption will fail.

5. Asymmetric signature: The signature algorithm includes two keys: a public key and a private key. The public key and the private key are paired. If data is signed with the private key, only the corresponding public key can be used to perform signature verification. Because the signature process and the signature verification process use two different keys, this algorithm is referred to as an asymmetric signature. A basic process of achieving confidential information exchange using an asymmetric signature may be as follows: A first party generates a pair of keys and discloses the public key. When the first party needs to send a message to another role (a second party), the first party uses its own private key to sign a confidential message before sending the confidential message to the second party. The second party then uses the public key of the first party to verify the signed message.

6. Smart contract: It is a computer agreement designed to transmit, verify, or execute contracts in an information-based manner. In a blockchain system, a smart contract (contract for short) is a code that can be understood and executed by each node of a blockchain and can execute any logic to obtain a result. In practical applications, smart contracts are managed and tested through transactions on the blockchain. Each transaction is equivalent to a Remote Procedure Call (RPC) request to the blockchain system. If a smart contract is equivalent to an executable program, the blockchain is equivalent to an operating system that provides a running environment. The blockchain can contain a plurality of contracts (such as a resource fusion function and a resource distribution function in this application), and the contracts are distinguished by contract identities (IDs), identification numbers, or names. In the embodiments of this application, both a topic posting contract and a topic subscription contract belong to smart contracts.

7. Trusted execution environment (TEE): A TEE is a security zone constructed by a software and hardware method on a computing platform, which can ensure that codes and data loaded within the security zone are protected in terms of confidentiality and integrity. The goal of the TEE is to ensure that a task is executed as expected, so as to ensure the confidentiality and integrity of an initial state, as well as the confidentiality and integrity of a runtime state.

FIG. 1 is a schematic diagram of a system architecture according to an embodiment of this application. As shown in FIG. 1, the system architecture can include a first device cluster, a second device cluster, a certificate device cluster, and a blockchain network.

The above system may include one or more first devices, and the embodiments of this application do not limit a quantity of the first devices. As shown in FIG. 1, the first device cluster includes a first device 100a. The first device 100a refers to a device with a platform application. The platform application may be an application that can provide platform functions for a video application, a live streaming application, a social application, an instant messaging application, a game application, a music application, a shopping application, a novel application, a browser, and other applications. An application client corresponding to the platform application may be an independent client or an embedded sub-client integrated into a certain client (such as a social client, an education client, and a multimedia client). It is not limited here. The first device 100a in the embodiments of this application can provide first service data of the above platform application. Based on a privacy protection requirement, a relevant technical measure (such as a bloom filter) can be used to hide original data (namely, the first service data) to generate a first bit array, which ensures the availability of the first service data.

The above system may include one or more second devices, and the embodiments of this application do not limit a quantity of the second devices. As shown in FIG. 1, the second device cluster includes a second device 100b. The second device 100b can provide a trusted execution environment, such as Software Guard Extensions (SGX). Based on its hardware technology, the second device 100b can run a data intersection application in the trusted execution environment, generate a data key in the data intersection application, and store the data key in a secure enclave, thus ensuring the security of the data key. In addition, the second device 100b can download the first bit array provided by the first device 100a in the blockchain network, and run the data intersection application in the trusted execution environment to perform a data intersection operation, that is, determine common service data between the first service data and the second service data through the first bit array and its own second service data. The common service data is referred to as service intersection data in the embodiments of this application. In addition, the second device 100b can perform service processing related to the service intersection data. For example, if the service intersection data is used for representing intersection users, advertisements for the above platform application may be sent to the intersection users to attract the intersection users to return to the platform application. The data intersection application may be an application that can provide service intersection data determining functions for a short video application, a live streaming application, a social application, an instant messaging application, a game application, a music application, a shopping application, a novel application, a browser, and other applications. An application client corresponding to the data intersection application may be an independent client or an embedded sub-client integrated into a certain client (such as a social client, an education client, and a multimedia client). It is not limited here.

The above system may include one or more certificate devices, and the embodiments of this application do not limit a quantity of the certificate devices. As shown in FIG. 1, the certificate device cluster includes a certificate device 100c. The certificate device 100c in the embodiments of this application refers to a device with a function of providing object information endorsement, such as a device corresponding to a Certificate Authority (CA). The certificate device cluster may provide object certification for a first object corresponding to the first device cluster and a second object corresponding to the second device cluster, and provide object information endorsement for the first object and the second object respectively. An object public key is bound to object information for verification to ensure the integrity and unforgeability of the object information and ensure the undeniability of an information sending party.

Any device in FIG. 1 (including the first device 100a, the second device 100b, and the certificate device 100c) includes but is not limited to a terminal device or a service server. The service server may be an independent physical server, or may be a server cluster or a distributed system formed by a plurality of physical servers, or may be a cloud server that provides basic cloud computing services such as cloud databases, cloud services, cloud computing, cloud functions, cloud storage, network services, cloud communication, middleware services, domain name services, security services, Content Delivery Networks (CDNs), big data, and artificial intelligence platforms. The terminal device includes but is not limited to a mobile phone, a computer, an intelligent voice interaction device, a smart home appliance, a vehicle-mounted terminal, an aircraft, and the like.

A blockchain network may include a blockchain node cluster 10. The blockchain node cluster 10 may include blockchain node 10A, blockchain node 10B, blockchain node 10C, and blockchain node 10N Similarly, the embodiments of this application do not limit a quantity of blockchain nodes in the blockchain node cluster 10. The blockchain nodes in FIG. 1 include but are not limited to mobile terminals or servers. The above server may be an independent physical server, or may be a server cluster or a distributed system formed by a plurality of physical servers, or may be a cloud server that provides basic cloud computing services such as cloud services, cloud databases, cloud computing, cloud functions, cloud storage, network services, cloud communication, middleware services, domain name services, security services, CDNs, big data, and artificial intelligence platforms. The above mobile terminal includes but is not limited to a mobile phone, a computer, an intelligent voice interaction device, a smart home appliance, a vehicle-mounted terminal, an aircraft, and the like. The mobile terminal and the server may be directly or indirectly connected in a wired or wireless communication manner. The embodiments of this application do not limit this.

There can be communication connections in the first device cluster. At the same time, the first device in the first device cluster may have a communication connection with the second device in the second device cluster. For example, there is a communication connection between the first device 100a and the second device 100b. At the same time, the first device in the first device cluster may have a communication connection with the certificate device in the certificate device cluster. For example, there is a communication connection between the first device 100a and the certificate device 100c. At the same time, the first device in the first device cluster can have a communication connection with a blockchain node in the blockchain node cluster 10. For example, the first device 100a can have a communication connection with the blockchain node 10A.

There can be communication connections in the second device cluster. At the same time, the second device in the second device cluster may have a communication connection with the certificate device in the certificate device cluster. For example, there is a communication connection between the second device 100b and the certificate device 100c. At the same time, the second device in the second device cluster can have a communication connection with a blockchain node in the blockchain node cluster 10. For example, the second device 100b can have a communication connection with the blockchain node 10A.

There can be communication connections in the certificate device cluster. At the same time, the certificate device in the certificate device cluster can have a communication connection with a blockchain node in the blockchain node cluster 10. For example, the certificate device 100c can have a communication connection with the blockchain node 10A.

There can be communication connections in the blockchain node cluster 10. For example, a communication connection exists between blockchain node 10A and blockchain node 10C, and a communication connection exists between blockchain node 10A and blockchain node 10N.

No connection manner is limited to the above communication connections. Direct or indirect connection can be achieved in a wired communication manner Direct or indirect connection can be achieved in a wireless communication manner. Direct or indirect connection can also be achieved in another manner. This application does not make limitations.

In specific implementations of this application, relevant data such as user information (for example, topic posting object information and topic subscription object information) is involved. When the embodiments of this application are applied to specific products or technologies, user permission or consent is required, and collection, use, and processing of the relevant data need to comply with the relevant laws, regulations, and standards of relevant countries and regions.

A data processing method based on blockchain according to an embodiment of this application may be described below.

Figure 2A:
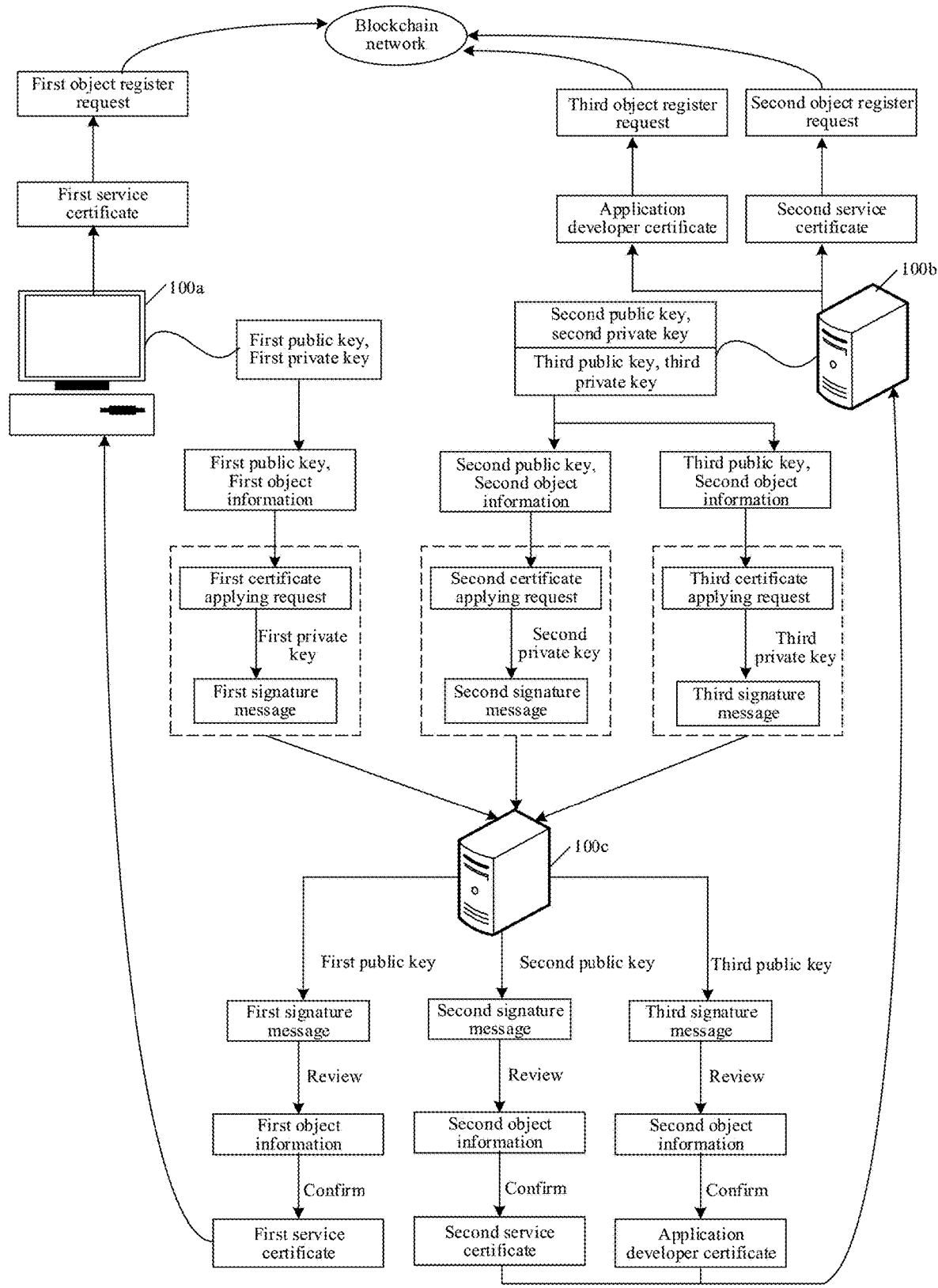
FIG. 2A is a schematic scenario diagram I of data processing based on blockchain according to an embodiment of this application.

Step 1: The first device 100a corresponding to a first object (such as a platform party) generates a first asymmetric key pair used for signing a service message. The second device 100b corresponding to a second object (such as an advertiser, which is another platform party different from the first object) generates a second asymmetric key pair used for signing the service message, and generates a third asymmetric key pair used for signing a data intersection application. The third asymmetric key pair can be used for determining that an application developer is a developer of the second object. FIG. 2A is a schematic scenario diagram I of data processing based on blockchain according to an embodiment of this application. The first asymmetric key pair includes a first private key in FIG. 2A and a first public key corresponding to the first private key. The second asymmetric key pair includes a second private key in FIG. 2A and a second public key corresponding to the second private key. The third asymmetric key pair includes a third private key in FIG. 2A and a third public key corresponding to the third private key.

Step 2: As shown in FIG. 2A, the first device 100a takes the first public key and first object information used for representing the first object as parameters to generate a first certificate applying request. The first device 100a signs the first certificate applying request through the first private key to obtain a first signature message, and sends the first certificate applying request carrying the first signature message to the certificate device 100c. The second device 100b takes the second public key and second object information used for representing the second object as parameters to generate a second certificate applying request. The second device 100b signs the second certificate applying request through the second private key to obtain a second signature message, and sends the second certificate applying request carrying the second signature message to the certificate device 100c. The second device 100b takes the third public key and the second object information used for representing the second object as parameters to generate a third certificate applying request. The second device 100b signs the third certificate applying request through the third private key to obtain a third signature message, and sends the third certificate applying request carrying the third signature message to the certificate device 100c. The second device 100b applies for a two-party certificate from the certificate device 100c.

Step 3: As shown in FIG. 2A, when receiving the first certificate applying request, the certificate device 100c first performs signature verification processing on the first signature message through the first public key; if the signature verification succeeds, the certificate device 100c reviews the first object information; and after confirming that the first object information is correct, the first certificate device 100c issues a first service certificate to the first device 100a. The first service certificate includes the first public key. Similarly, when receiving the second certificate applying request, the certificate device 100c first performs signature verification processing on the second signature message through the second public key; if the signature verification succeeds, the certificate device 100c reviews the second object information; and after confirming that the second object information is correct, the certificate device 100c issues a second service certificate to the second device 100b. The second service certificate includes the second public key. Similarly, when receiving the third certificate applying request, the certificate device 100c first performs signature verification processing on the third signature message through the third public key; if the signature verification succeeds, the certificate device 100c reviews the second object information; and after confirming that the second object information is correct, the certificate device 100c issues an application developer certificate to the second device 100b. The application developer certificate includes the third public key.

Step 4: As shown in FIG. 2A, the first device 100a takes the first service certificate as a parameter and initiates a first object register request to the blockchain network. The first object register request also carries a signature message. A generation process of the signature message can refer to the generation process of the first signature message and will not be described in detail here. In order to distinguish the signature messages mentioned above, the signature message carried by the first object register request is referred to as a fourth signature message. Similarly, a second object register request mentioned below carries a fifth signature message, and a third object register request mentioned below carries a sixth signature message.

When receiving the first object register request, a blockchain node in the blockchain network first performs signature verification processing on the fourth signature message through the first public key. If the signature verification succeeds, the blockchain node reviews the first service certificate. If the review of the first service certificate succeeds, the blockchain node calls an object contract in a smart contract, and the object contract generates, on the basis of the first public key in the first service certificate, a first address corresponding to the first object information. The first address is taken as a first object identifier, and the first object identifier, the first service certificate, and the first object information are associated and stored. Structural parameters and a contract method of the object contract can refer to the object contract shown in FIG. 2B.

Similarly, when receiving the second object register request, the blockchain node in the blockchain network first performs signature verification processing on the fifth signature message through the second public key. If the signature verification succeeds, the blockchain node reviews the second service certificate. If the review of the second service certificate succeeds, the blockchain node calls an object contract in the smart contract, and the object contract generates, on the basis of the second public key in the second service certificate, a second address corresponding to the second object information. The second address is taken as a second object identifier, and the second object identifier, the second service certificate, and the second object information are associated and stored. Similarly, when receiving the third object register request, the blockchain node first performs signature verification processing on the sixth signature message through the third public key. If the signature verification succeeds, the blockchain node reviews the application developer certificate. If the review of the application developer certificate succeeds, the blockchain node calls an object contract in the smart contract, and the object contract generates, on the basis of the third public key in the application developer certificate, a third address corresponding to the second object information. The third address is taken as a third object identifier, and the third object identifier, the application developer certificate, and the second object information are associated and stored.

Figure 2B:
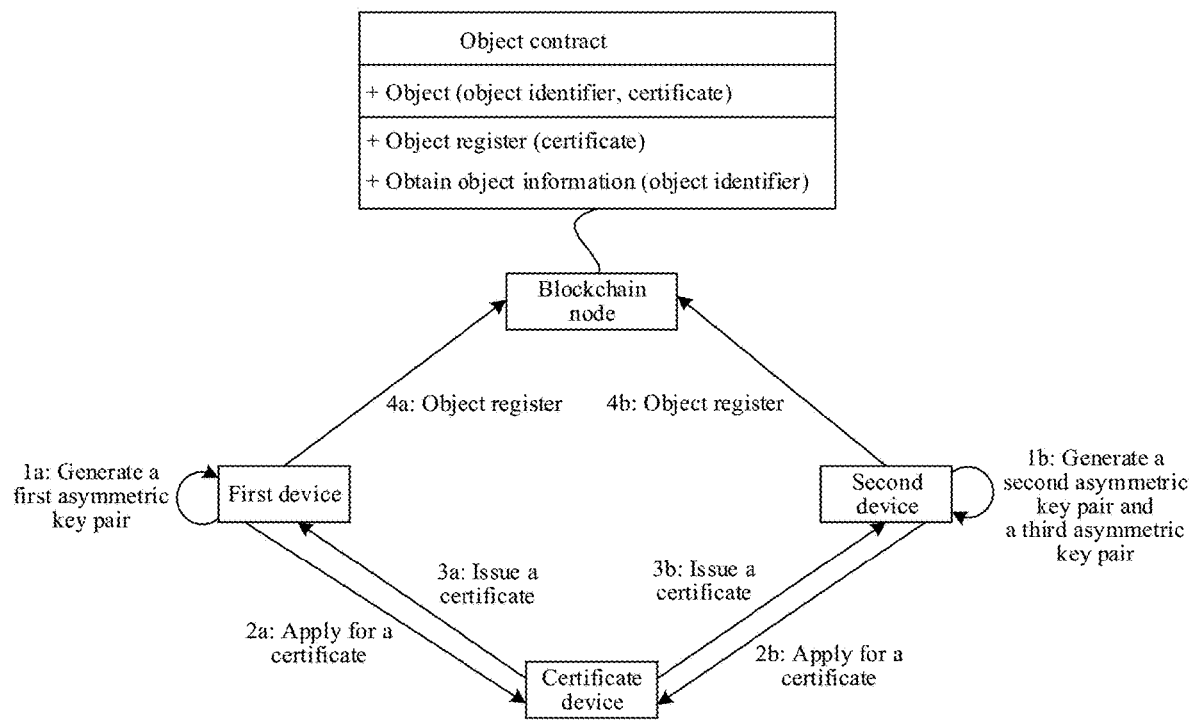
FIG. 2B is a flowchart of an object registering method based on blockchain according to an embodiment of this application.

Step 1 to step 4 above are described in more detail below in connection with FIG. 2B, which is a flowchart of an object registering method based on blockchain according to an embodiment of this application. As shown in FIG. 2B, step 1a: The first device generates the first asymmetric key pair. Step 1b: The second device generates the second asymmetric key pair and the third asymmetric key pair. Step 2a: The first device applies for a certificate from a certificate device. Step 2b: The second device applies for a certificate from the certificate device. Step 3a: The certificate device issues a certificate to the first device. Step 3b: The certificate device issues a certificate to the second device. Step 4a: The first device performs object registration to a blockchain node. Step 4b: The second device performs object registration to the blockchain node. As can be seen from the above, information of participants (including a first object and a second object) in the embodiments of this application is authenticated by a Certificate Authority (CA), and keys are linked to object information. Collaboration processes are signed using private keys, ensuring that each flow can be related to an initiator. Therefore, tampering and denial can be prevented; tracing and supervision are facilitated; and wrongdoing is reduced.

Figure 2C:
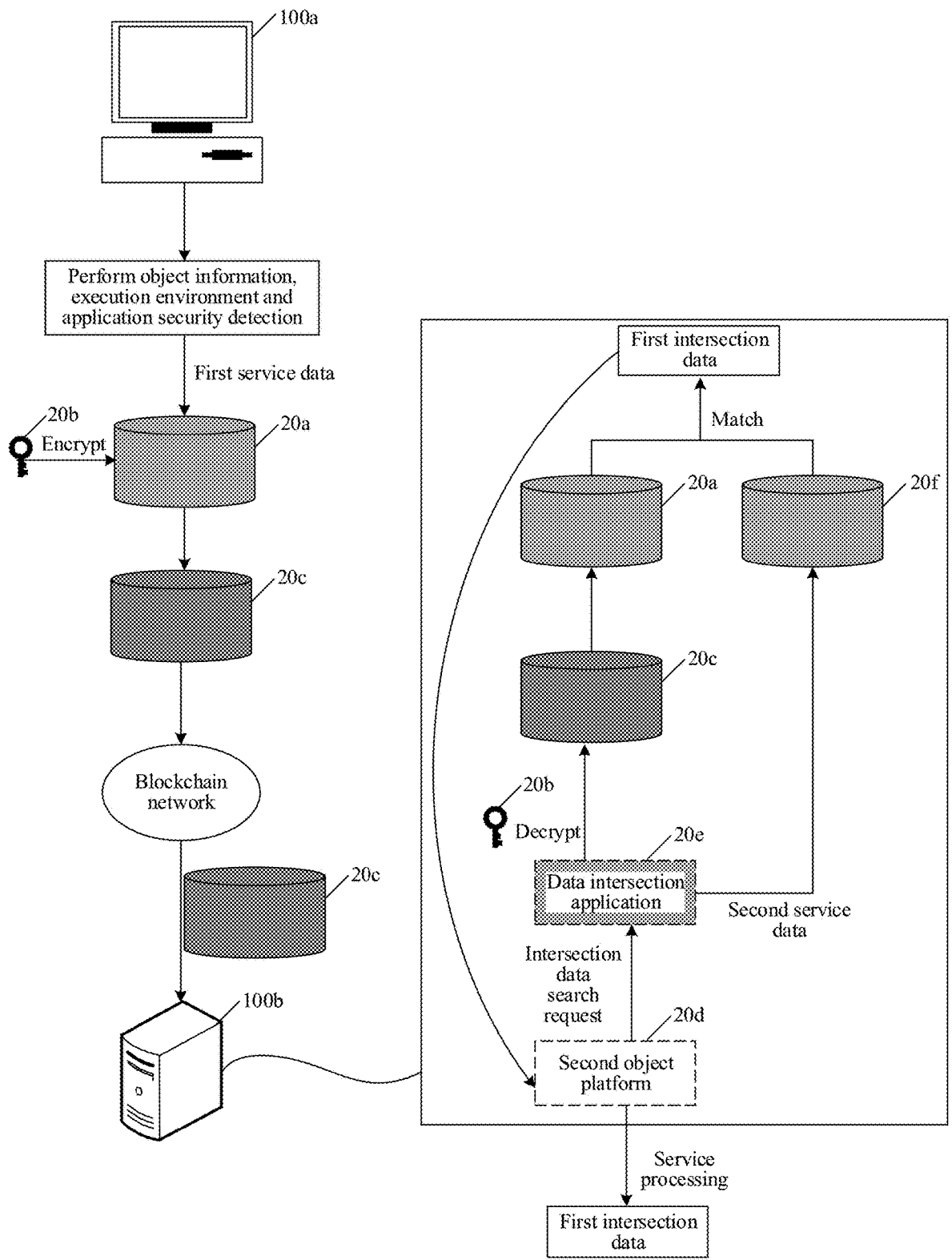
FIG. 2C is a schematic scenario diagram II of data processing based on blockchain according to an embodiment of this application.

Step 5: The first device needs to confirm that first service data satisfies a data uploading condition. A confirming process can be summarized as follows. FIG. 2C is a schematic scenario diagram II of data processing based on blockchain according to an embodiment of this application. As shown in FIG. 2C, the first device 100a performs object information, execution environment and application security detection on the second device 100b through remote certification. Specific implementation of this process will not be described in detail here, and reference can be made to the description of step S101 in the embodiment corresponding to FIG. 3 below and the description in the embodiment corresponding to FIG. 5 below. Through the above security detection, if the first device 100a determines that the first service data satisfies the data uploading condition, the first device 100a obtains a first bit array 20a corresponding to the first service data. The first bit array 20a can make original data, namely, the first service data, available and invisible, thus improving the security of the first service data. A specific implementation process of the first bit array 20a can refer to the description of step S101 in the embodiment corresponding to FIG. 3 below and will not be described in detail here.

Step 6: As shown in FIG. 2C, the first device 100a encrypts the first bit array 20a using a data key 20b to obtain the ciphertext bit array 20c. The data key 20b is generated by the second device 100b in a data intersection application in a trusted execution environment 20e. Due to a secure generation environment, namely, the TEE, of the data key 20b, the data key 20b will not leak. Using the data key 20b to encrypt the first bit array 20a is highly secure. An enclave (namely, the data intersection application) that only generates the data key can decrypt the ciphertext bit array 20c through the data key 20b, thus ensuring the security of the first bit array 20a.

Step 7: The first device 100a signs the ciphertext bit array 20c through the first private key to obtain a seventh signature message. As shown in FIG. 2C, the first device 100a transmits the ciphertext bit array 20c carrying the seventh signature message to the blockchain network. After receiving the ciphertext bit array 20c, the blockchain node in the blockchain network first performs signature verification on the seventh signature message through the first public key in the first asymmetric key pair. If the signature verification succeeds, the blockchain node ensures that the ciphertext bit array 20c is intact and has not been tampered with. Therefore, the ciphertext bit array 20c is uploaded, namely, stored.

Step 8: The second device 100b sends a data downloading request for obtaining the ciphertext bit array 20c to the blockchain network. After obtaining the data downloading request, the blockchain node decides to return the ciphertext bit array 20c or refuse to process the data downloading request according to a current subscription state corresponding to the second object information (equivalent to the topic subscription object information of this application), and uploads this process for easy tracing. If the current subscription state for the second object information indicates that the second device 100b has a permission to obtain the ciphertext bit array 20c, the blockchain node returns the ciphertext bit array 20c to the second device 100b. The blockchain network witnesses the process that the second device 100b obtains the ciphertext bit array 100c, ensuring the data traceability and preventing the second device 100b from not providing services.

Step 9: As shown in FIG. 2C, the second device 100b has an ordinary execution environment 20d and a trusted execution environment 20e. The ordinary execution environment 20d can run a second object platform (which is different from a platform corresponding to the first device 100a) corresponding to the second object, for example, an advertiser platform. The data intersection application is run in the trusted execution environment 20e. In the second object platform run in the ordinary execution environment 20d, the second device 100b takes the ciphertext bit array 20c and the second service data as parameters to generate an intersection data search request, and sends the intersection data search request to the data intersection application run in the trusted execution environment 20e.

Step 10: As shown in FIG. 2C, in the data intersection application, the second device 100b decrypts the ciphertext bit array 20c through the data key 20b to obtain the first bit array 20a. Further, the second device 100b generates a second bit array 20f corresponding to the second service data. Through the first bit array 20a and the second bit array 20f, the second device 100b can determine common service data between the first service data and the second service data. The common service data is referred to as service intersection data in the embodiments of this application.

Step 11: As shown in FIG. 2C, the second device 100b transmits the service intersection data determined in the trusted execution environment 20e to the second object platform. Further, the second device 100b performs service processing related to the service intersection data.

The embodiments of this application can be applied to various scenarios, including but not limited to a cloud technology, artificial intelligence, intelligent transportation, assisted driving, and the like. The embodiments of this application are applicable to a scenario of determining service intersection data between platforms, a platform recommendation scenario, a platform evaluation scenario, and the like. Specific service scenarios will not be listed here.

Figure 3:
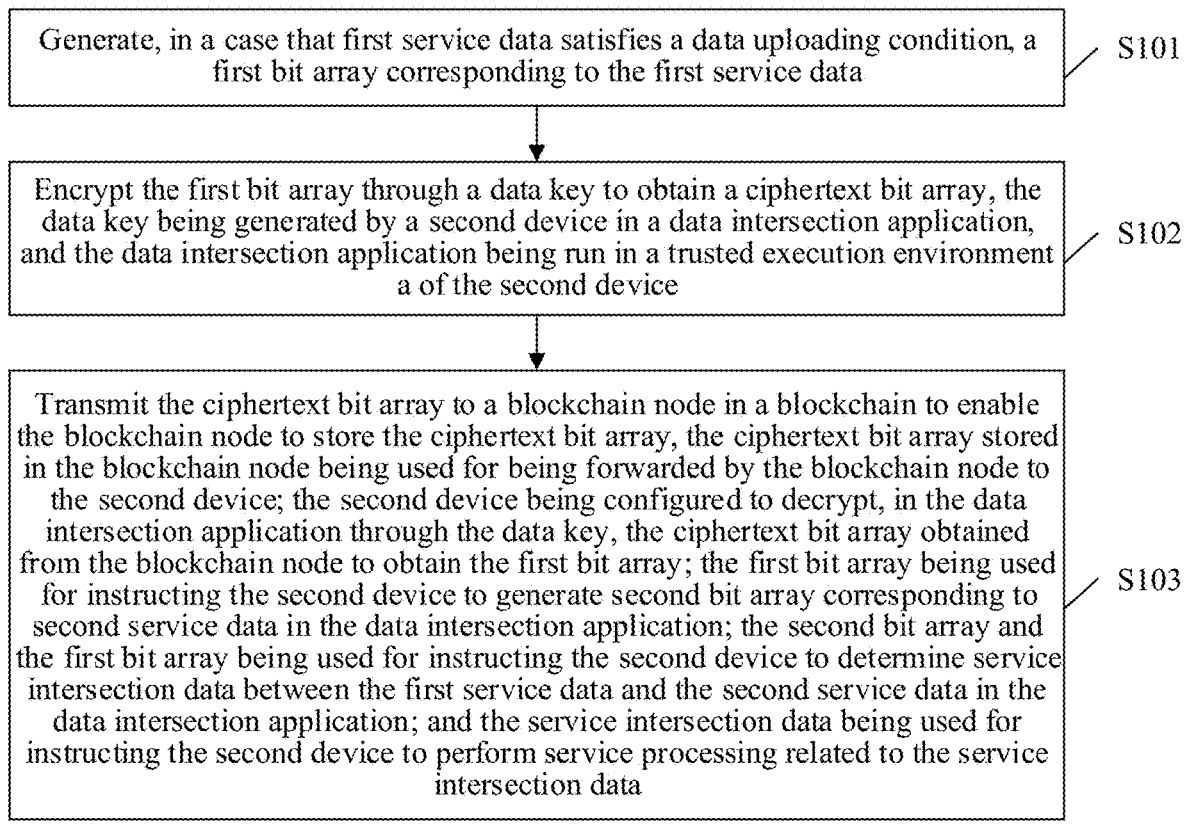
FIG. 3 is a flowchart I of a data processing method based on blockchain according to an embodiment of this application.

FIG. 3 is a flowchart I of a data processing method based on blockchain according to an embodiment of this application. The data processing method based on blockchain may be performed by a first device or a second device, or may be performed by a blockchain node, or may be alternately performed by at least two of the first device, the second device, and the blockchain node. It is not limited here. For the sake of narration and understanding, this embodiment of this application is narrated by being performed by a first device. The first device may be the first device 100a of the foregoing embodiment corresponding to FIG. 1. As shown in FIG. 3, the data processing method based on blockchain may at least include following step S101 to step S103.

Step S101: Generate, in response to that first service data satisfies a data uploading condition, a first bit array corresponding to the first service data.

Specifically, the followings are executed: generating a topic for the first service data, and generating a topic posting request including the topic and topic posting object information; signing the topic posting request through a device private key corresponding to the first device to obtain a signature message z, and calling a topic posting contract of a blockchain node on the basis of the topic posting request; transmitting, on the basis of the topic posting contract, the topic posting request carrying the signature message z to the blockchain node to enable the blockchain node to call the topic posting contract in response to that validity verification on the topic posting request succeeds, the topic posting contract being applied in instructing the blockchain node to store the topic in a case of verifying that the topic posting object information belongs to register object information and of determining that the topic has a to-be-posted attribute; the topic stored at the blockchain node being used to instruct the second device to transmit a topic subscription request to the blockchain node, the signature message z being applied in instructing the blockchain node to perform validity verification on the topic posting request; obtaining the topic subscription request forwarded by the blockchain node in a case of determining that the topic subscription request has a request-valid attribute; and determining a relationship between the first service data and the data uploading condition according to the topic subscription request forwarded by the blockchain node, the relationship between the first service data and the data uploading condition including the first service data satisfying the data uploading condition or the first service data not satisfying the data uploading condition.

In some embodiments, the specific process of determining a relationship between the first service data and the data uploading condition according to the topic subscription request forwarded by the blockchain node may include: generating a remote certification request according to the topic subscription request forwarded by the blockchain node; transmitting the remote certification request to the second device to enable the second device to generate, according to the remote certification request, an intermediate key pair g that includes an intermediate public key f, the intermediate public key f being used for instructing the second device to invoke the trusted execution environment a to generate a remote certification report of the data intersection application; and obtaining the remote certification report returned by the second device, and determining a relationship between the first service data and the data uploading condition according to the remote certification report.

In some embodiments, the specific process of generating a remote certification request according to the topic subscription request forwarded by the blockchain node may include: generating, according to the topic subscription request forwarded by the blockchain node, a certification challenge random number and an intermediate key pair j including an intermediate private key h and an intermediate public key i; and generating the remote certification request according to the intermediate public key i and the certification challenge random number, the intermediate public key i being used for instructing the second device to generate a communication key according to the intermediate public key i, the certification challenge random number, and an intermediate private key k in the intermediate key pair g, and the communication key being used for encrypting the data key to obtain encrypted data key; the step may further include: obtaining an intermediate public key f in the remote certification report, and generating the communication key according to the intermediate public key f, the certification challenge random number, and the intermediate private key h; and obtaining the encrypted data key returned by the second device, and decrypting the encrypted data key through the communication key to obtain the data key.

Specifically, the followings are executed: obtaining an initial bit array mapped with a first random number, and a random mapping function, and inputting the first service data to the random mapping function; generating, through the random mapping function, a second random number corresponding to the first service data, the first random number including the second random number; determining a to-be-updated bit array in the initial bit array, the to-be-updated bit array being mapped with the second random number; and updating the to-be-updated bit array in the initial bit array, and determining the updated initial bit array to be the first bit array.

Figure 4A:
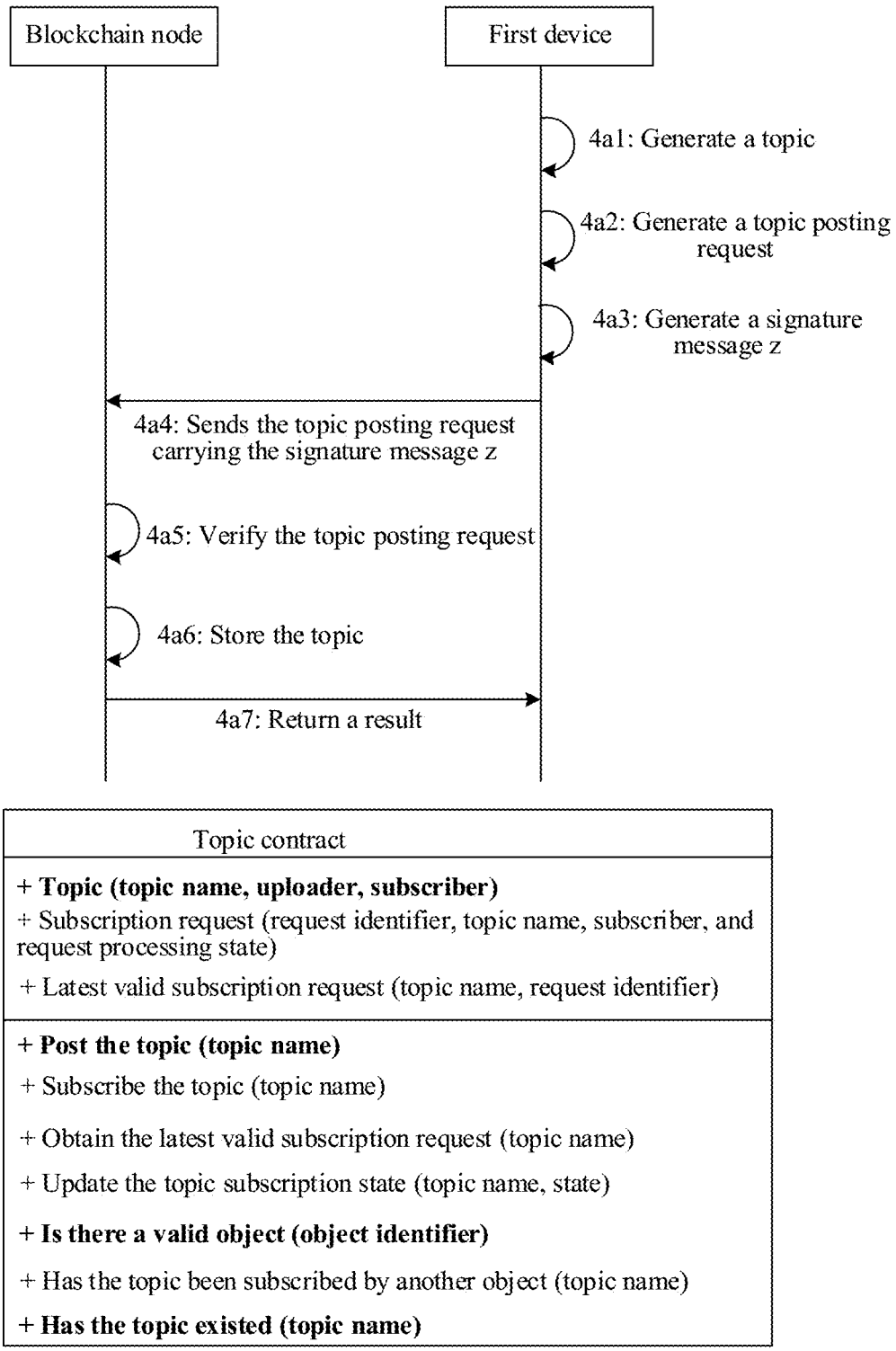
FIG. 4A is a schematic diagram I of a timing sequence of a data processing method based on blockchain according to an embodiment of this application.

In the embodiments of this application, the first device first posts the topic corresponding to the first service data before posting the ciphertext bit array, so that a data receiver (including the second device) subscribes to the topic. Therefore, the first device can review the topic subscription request corresponding to the second device and return a review result to the blockchain network. If the review result indicates that the review succeeds, it is determined that the first service data satisfies the data uploading condition. FIG. 4A is a schematic diagram I of a timing sequence of a data processing method based on blockchain according to an embodiment of this application. As shown in FIG. 4A, step 4a1: The first device generates the topic. The embodiments of this application do not limit a platform corresponding to the first device, so it does not limit the type of first service data. Step 4a2: The first device generates the topic posting request, where the topic posting request includes the topic and topic posting object information (which is equivalent to the first object information mentioned above). Step 4a3: The first device generates the signature message z. The first device signs the topic posting request through a device private key (which is equivalent to the first private key mentioned above) corresponding to the first device to obtain the signature message z. Step 4a4: The first device sends the topic posting request carrying the signature message z to the blockchain node. Specifically, the first device calls a topic posting method (namely, a topic posting contract) of a topic contract on a blockchain to post the topic to a blockchain network. Structural parameters and a contract method (including the topic posting method) of the topic contract can refer to the topic contract shown in FIG. 4A. Step 4a5: The blockchain node verifies the topic. Specifically, after receiving the topic posting request, the blockchain node performs signature verification processing on the signature message z through the device public key (which is equivalent to the first public key mentioned above) corresponding to the first device. If the verification succeeds, it will ensure that the topic posting request has not been tampered with. Further, the topic posting method is called. Through the topic posting method, the blockchain node can verify that an uploader (namely, the topic posting object information) belongs to uploaded register object information, which is equivalent to a valid object represented in bold in FIG. 4A. Secondly, it can ensure that the topic has not been registered, that is, whether the topic has existed on the blockchain. Step 4a6 is executed after the above verification succeeds. Step 4a6: The blockchain node stores the topic. Step 4a7: The blockchain node returns the result to the first device. The result may be information indicating that the blockchain node stores the topic. The embodiments of this application will not describe in detail the process of sending the topic subscription request to the blockchain node by the second device, and reference can be made to the description in the embodiment corresponding to FIG. 7 below.

Figure 4B:
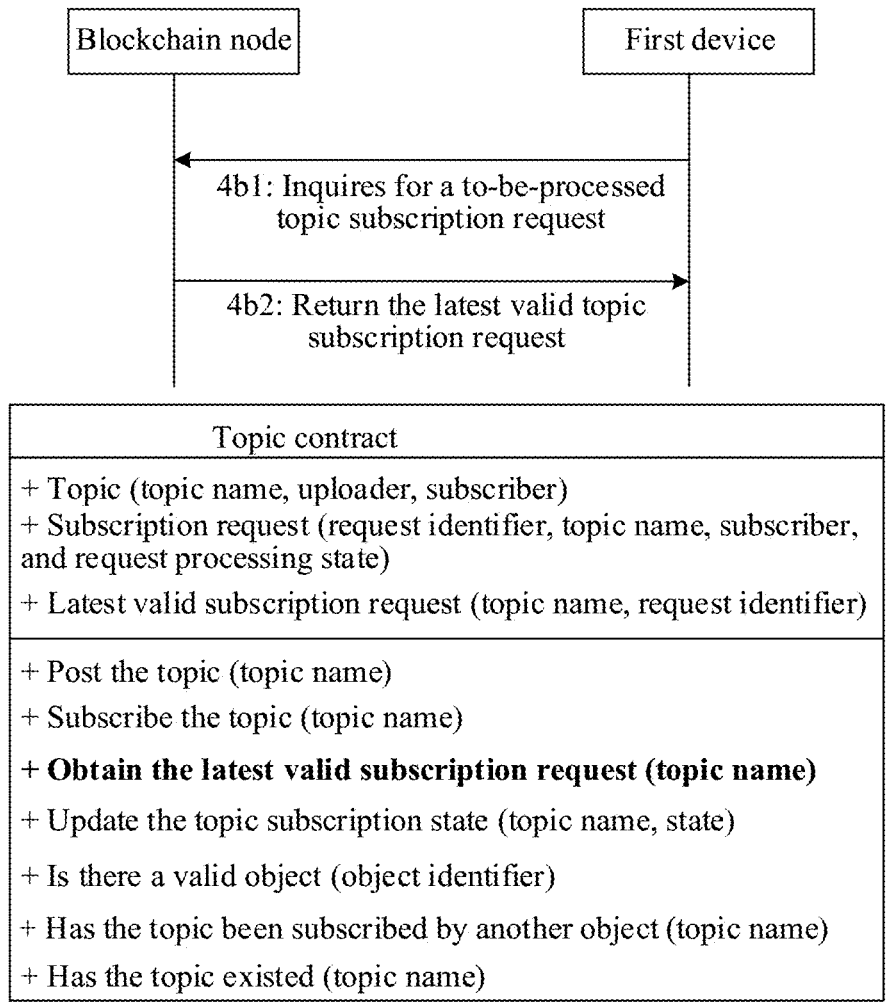
FIG. 4B is a schematic diagram II of a timing sequence of a data processing method based on blockchain according to an embodiment of this application.

During determining that the topic subscription request has the request-valid attribute, the blockchain node forwards the topic subscription request to the first device, or the first device inquires the blockchain node for a to-be-processed topic subscription request. As shown in FIG. 4B, FIG. 4B is a schematic diagram II of a timing sequence of a data processing method based on blockchain according to an embodiment of this application. Step 4b1: The first device inquires the blockchain node for a to-be-processed topic subscription request. Step 4b2: The blockchain node returns the latest valid topic subscription request to the first device. The blockchain node can take the topic (which is equivalent to a topic name) as a parameter and call a method in the topic contract, for example, "Obtaining the latest valid subscription request" in bold in FIG. 4B, thus obtaining the to-be-processed topic subscription request.

Figure 4C:
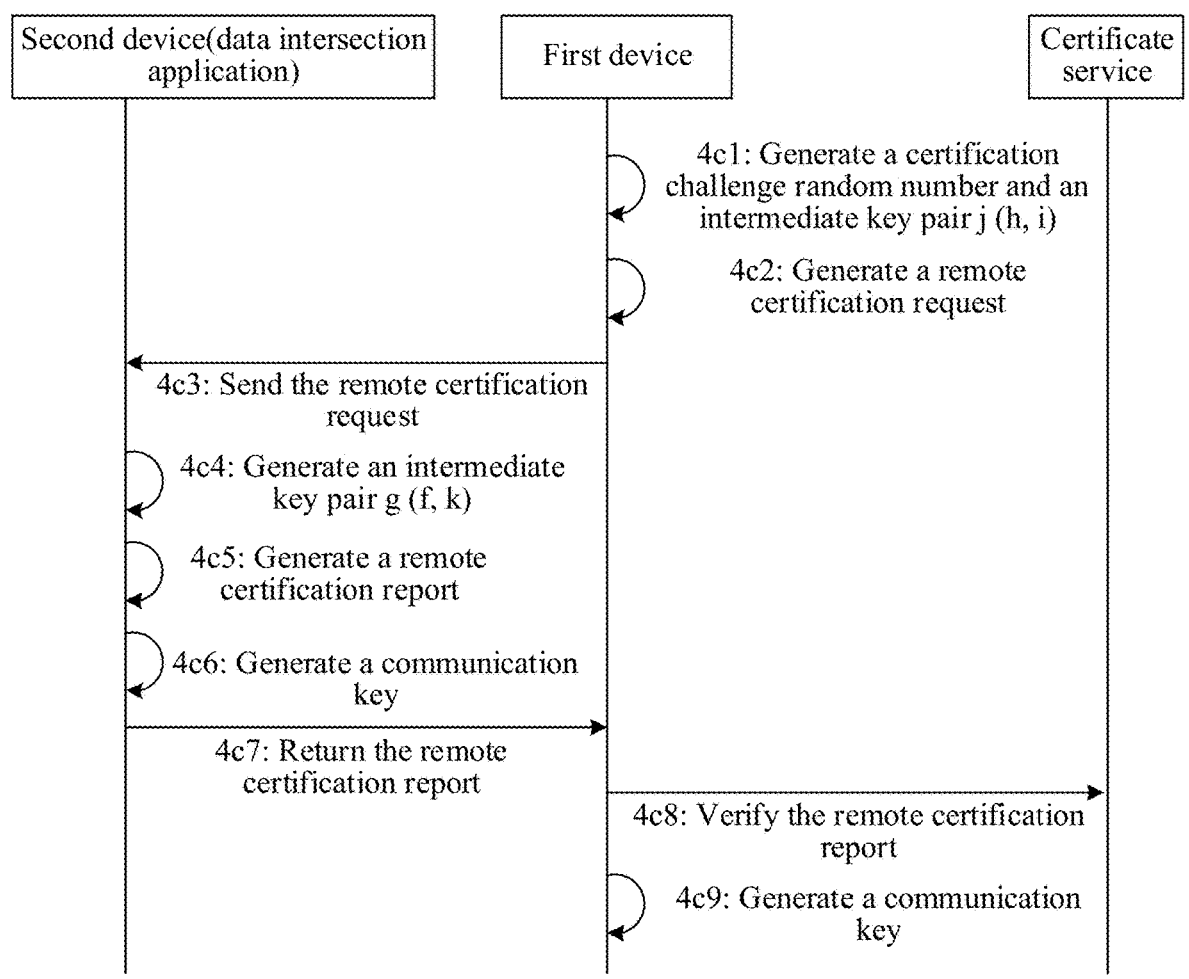
FIG. 4C is a schematic diagram III of a timing sequence of a data processing method based on blockchain according to an embodiment of this application.

The first device can determine the relationship between the first service data and the data uploading condition according to the topic subscription request forwarded by the blockchain node. FIG. 4C is a schematic diagram III of a timing sequence of a data processing method based on blockchain according to an embodiment of this application. As shown in FIG. 4C, step 4c1: The first device generates a certification challenge random number and an intermediate key pair j (h, i), where h represents an intermediate public key in the intermediate key pair j, and i represents an intermediate private key in the intermediate key pair j. The intermediate key pair j is an asymmetric key pair. Step 4c2: The first device generates a remote certification request. Specifically, the first device takes the intermediate public key h and the certification challenge random number as parameters to generate the remote certification request. Step 4c3: The first device sends the remote certification request. Step 4c4: The second device generates an intermediate key pair g (f, k), where f represents an intermediate public key in the intermediate key pair g, and k represents an intermediate private key in the intermediate key pair g. The intermediate key pair g is also an asymmetric key pair. Step 4c5: The second device generates a remote certification report. Specifically, the second device takes the intermediate public key f as a parameter and calls a trusted execution environment a to generate the remote certification report. Step 4c6: The second device generates a communication key. Specifically, the second device generates the communication key according to the intermediate public key i, the certification challenge random number, and the intermediate private key k in the remote certification request, and saves the communication key. One feasible method is to generate the communication key through a key exchange algorithm. The intermediate private key h and intermediate public key i of the intermediate key pair j can be represented by following formula (1).

$$i=(G\hat{\ }h) \bmod p \quad (1)$$

where G in formula (1) is a base number; p is a prime number; and G and P both belong to the certification challenge random number.

The intermediate private key k and intermediate public key f of the intermediate key pair g can be represented by following formula (2).

$$f=(G\hat{\ }k) \bmod p \quad (2)$$

The communication key generated by the first device and the second device respectively can be represented by following formula (3).

$$S=(i\hat{\ }k) \bmod p=(f\hat{\ }h) \bmod p \quad (3)$$

Step 4c7: The second device returns the remote certification report to the first device. Step 4c8: The first device verifies the remote certification report. The first device calls a Provisioning Certification Service (PCS) to verify the remote certification report. If the verification succeeds, that is, if the first service data satisfies the data uploading condition, step 4c9 is executed. Step 4c9: The first device generates a communication key. Specifically, the first device generates the communication key according to the intermediate public key f, the certification challenge random number, and the intermediate private key h in the remote certification report, which can refer to Formula (3) above. Afterwards, the first device saves the communication key.

Figure 4D:
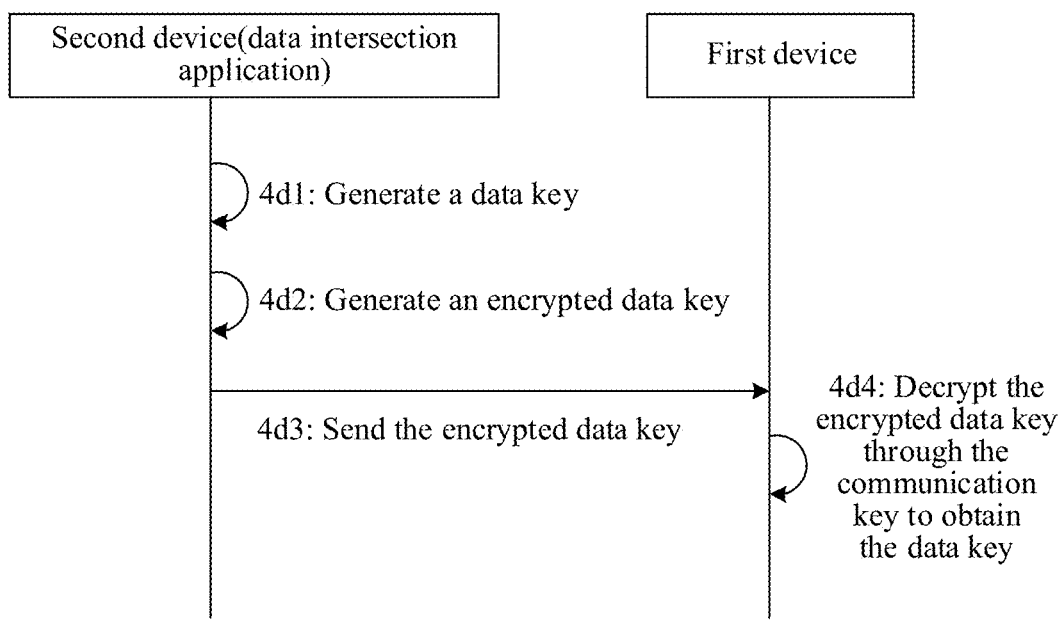
FIG. 4D is a schematic diagram IV of a timing sequence of a data processing method based on blockchain according to an embodiment of this application.

In the embodiments of this application, in order to ensure the security of the first bit array, the first device may encrypt the first bit array, and the data key that encrypts the first bit array is generated by the second device in the trusted execution environment. FIG. 4D is a schematic diagram IV of a timing sequence of a data processing method based on blockchain according to an embodiment of this application. As shown in FIG. 4D, step 4d1: The second device generates a data key. The second device can generate the data key in a trusted execution environment when obtaining the remote certification request, and run and store the data key in the trusted execution environment. Step 4d2: The second device generates an encrypted data key. Specifically, the second device encrypts the data key through the communication key to obtain the encrypted data key. Step 4d3: The second device sends the encrypted data key to the first device. Step 4d4: The first device decrypts the encrypted data key through the communication key to obtain the data key. Devices other than the first device and the second device cannot generate a communication key because the devices do not have the intermediate private key k or h.

When the first service data satisfies the data uploading condition, the first device generates the first bit array corresponding to the first service data. One feasible method for generating the first bit array is to use a bloom filter. The bloom filter is composed of an extremely long binary vector (which can be equivalent to an initial bit array, and each point of an original binary vector is 0) and a series of random mapping functions. The bloom filter can be configured to retrieve whether an element (such as the second service data in the embodiments of this application) is in a set (such as the first service data in the embodiments of this application). The principle is that when an element is added to a set, this element is mapped into L points in the initial bit array through L random mapping functions (L is usually greater than 1), and the L points are set to be 1. During the retrieval, whether the L points in the first bit array are 1 is determined. If any one of the L points in the first bit array is not 1, it can be determined that the element does not belong to the set. If all the L points in the first bit array are 1, the element may be in this set. In the embodiments of this application, this element is determined to be service intersection data.

Figure 4E:
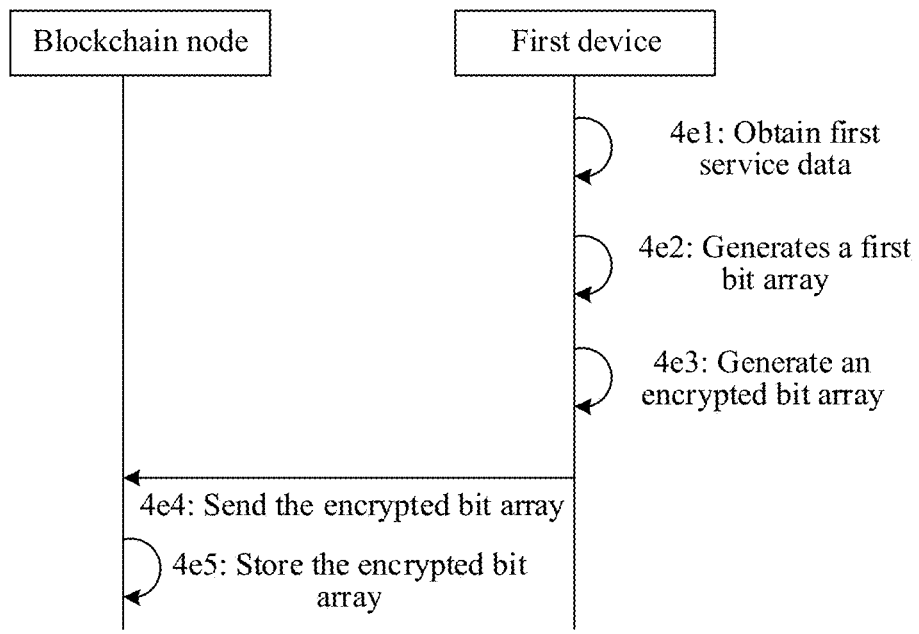
FIG. 4E is a schematic diagram V of a timing sequence of a data processing method based on blockchain according to an embodiment of this application.

FIG. 4E is a schematic diagram V of a timing sequence of a data processing method based on blockchain according to an embodiment of this application. As shown in FIG. 4E, step 4e1: The first device obtains the first service data. Step 4e2: The first device generates the first bit array. The first device generates a bloom filter and stores the first service data into the bloom filter. At this time, the first bit array is the bloom filter with the first service data. In the embodiments of this application, the first device does not provide plaintext data (the first service data), but reads the first service data from a database and stores the first service data into the bloom filter, which ensures that the second device can filter out service intersection data from the first service data without leaking the data and achieving the goal that the data is available and invisible.

Step S102: Encrypt the first bit array through a data key to obtain a ciphertext bit array, the data key being generated by a second device in a data intersection application, and the data intersection application being run in a trusted execution environment a of the second device.

Specifically, referring to FIG. 4E, step 4e3: The first device generates an encryption bit array. The first device encrypts the first bit array through the data key to obtain the ciphertext bit array.

Step S103: Transmit the ciphertext bit array to a blockchain node in a blockchain to enable the blockchain node to store the ciphertext bit array, the ciphertext bit array stored in the blockchain node being used for being forwarded by the blockchain node to the second device; the second device being configured to decrypt, in the data intersection application through the data key, the ciphertext bit array obtained from the blockchain node to obtain the first bit array; the first bit array being used for instructing the second device to generate second bit array corresponding to second service data in the data intersection application; the second bit array and the first bit array being used for instructing the second device to determine service intersection data between the first service data and the second service data in the data intersection application; and the service intersection data being used for instructing the second device to perform service processing related to the service intersection data.

Specifically, Step 4e4: The first device sends the encrypted bit array to the blockchain node. Step 4e5: The blockchain node stores the encrypted bit array.

The embodiments of this application do not describe in detail the processes that the second device obtains the encrypted bit array and determines the service intersection data. The processes that the second device obtains the encrypted bit array and determines the service intersection data can refer to the description in the embodiment corresponding to FIG. 7 below.

In the embodiments of this application, it can be ensured by generating the first bit array corresponding to the first service data that the first service data is available and invisible, so that the security of the first service data can be improved. Further, the data key is generated by the data intersection application in the trusted execution environment a, so that a generation environment is secure, an application environment is secure, and a storage environment is secure. Therefore, encrypting the first bit array through the data key can improve the security of the first bit array. Further, transmitting the ciphertext bit array to the blockchain can accurately trace an obtaining state of the second device for the ciphertext bit array. In addition, the embodiments of this application determine the service intersection data between the first service data and the second service data according to the first bit array and the second bit array corresponding to the second service data, so that the service processing related to the service intersection data can be performed, and the security of the first service data is further improved. According to the above, the adoption of the embodiments of this application can improve the security of data (including the first service data and the first bit array) can be improved, and a data obtaining state can be accurately traced.

Figure 5:
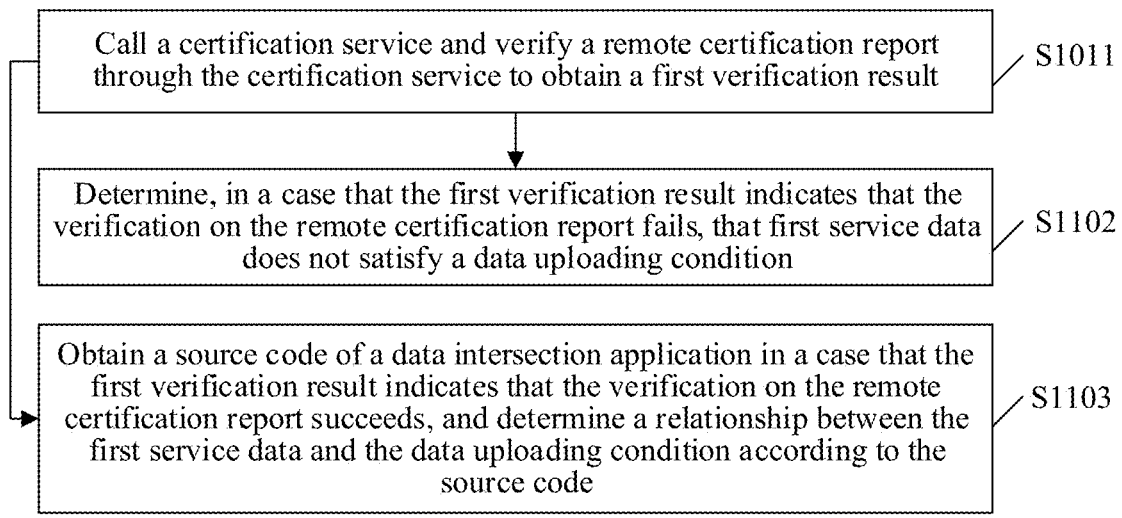
FIG. 5 is a flowchart II of a data processing method based on blockchain according to an embodiment of this application.

FIG. 5 is a flowchart II of a data processing method according to an embodiment of this application. As shown in FIG. 5, the process of the data processing method includes step S1011 to step S1013 below, and step S1011 to step S1013 reflect a specific embodiment of step S101 in the embodiment corresponding to FIG. 3.

Step S1011: Call a certification service, and verify the remote certification report through the certification service to obtain a first verification result.

As an example, remote certification occurs before the first device sends the ciphertext bit array to the blockchain network. It mainly verifies the security of a data running environment and an application program of the second device, as well as the correctness of developer information (namely, a subscriber), thereby ensuring that the ciphertext bit array is provided to a correct user and that the ciphertext bit array is used securely.

As an example, the embodiments of this application do not limit an order of verifying the data running environment, the application program, and the developer information. Verification can be carried out in parallel or in series. In case of serial verification, the data running environment can be verified first or last.

Step S1012: Determine, in response to that the first verification result indicates that the verification on the remote certification report fails, that the first service data does not satisfy the data uploading condition.

As an example, when the first verification result indicates that the verification on the remote certification report fails, it is determined that the trusted execution environment a does not have an environment-secure attribute; and a first updated subscription state indicating that the trusted execution environment a does not have the environment-secure attribute is generated, and the first updated subscription state is transmitted to the blockchain node to enable the blockchain node to set the first updated subscription state for the topic subscription request.

The first device calls the certification service to verify the validity of the remote certification report. When the verification fails, it indicates that the trusted execution environment of the second device is unreliable and the subscription request needs to be ignored. In this case, the first device updates the subscription state to "Environment Unsecure", namely, the first updated subscription state, and terminates the subsequent flow.

Step S1013: Obtain a source code of the data intersection application in response to that the first verification result indicates that the verification on the remote certification report succeeds, and determine the relationship between the first service data and the data uploading condition according to the source code.

As an example, the source code is verified to obtain a second verification result; in response to that the second verification result indicates that verification on the source code succeeds, topic subscription object information for the data intersection application is obtained from the remote certification report, and the topic subscription object information is verified to obtain a third verification result; a remote measurement value for the source code is obtained from the remote certification report, and the remote measurement value is verified to obtain a fourth verification result; the relationship between the first service data and the data uploading condition is determined according to the third verification result and the fourth verification result; and in response to that the second verification result indicates that the verification on the source code fails, it is determined that the first service data does not satisfy the data uploading condition. The following technical solutions can also be performed: determining, in response to that the second verification result indicates that the verification on the source code fails, that the source code does not have a code-secure attribute; and generating a second updated subscription state indicating that the source code does not have the code-secure attribute, and transmitting the second updated subscription state to the blockchain node to enable the blockchain node to set the second updated subscription state for the topic subscription request.

In some embodiments, the specific process of verifying the topic subscription object information to obtain a third verification result may include: obtaining an application development object certificate of the data intersection application, obtaining application development object information from the application development object certificate, and comparing the topic subscription object information with the application development object information; generating, in response to that the topic subscription object information and the application development object information are different, the third verification result indicating that the verification on the topic subscription object information fails; and generating, in response to that the topic subscription object information and the application development object information are the same, the third verification result indicating that the verification on the topic subscription object information succeeds. The following technical solutions can also be performed: generating, in response to that the third verification result indicating that the verification on the topic subscription object information fails, a third updated subscription state indicating that the topic subscription object information is unauthorized object information; and transmitting the third updated subscription state to the blockchain node to enable the blockchain node to set the third updated subscription state for the topic subscription request.

In some embodiments, the specific process of verifying the remote measurement value to obtain a fourth verification result may include: compiling the source code in a trusted execution environment b of the first device to obtain a credible measurement value; comparing the remote measurement value with the credible measurement value, and generating, in response to that the remote measurement value and the credible measurement value are different, the fourth verification result indicating that the verification on the remote measurement value fails; and generating, in response to that the remote measurement value and the credible measurement value are the same, the fourth verification result indicating that the verification on the remote measurement value succeeds. The following technical solutions can also be performed: generating, in response to that the fourth verification result indicates that the verification on the remote measurement value fails, a fourth updated subscription state indicating that the source code does not match a running code; and transmitting the fourth updated subscription state to the blockchain node to enable the blockchain node to set the fourth updated subscription state for the topic subscription request.

In some embodiments, the specific process of determining the relationship between the first service data and the data uploading condition according to the third verification result and the fourth verification result may include: determining, in response to that the third verification result indicates that the verification on the topic subscription object information succeeds and the fourth verification result indicates that the verification on the remote measurement value succeeds, that the first service data satisfies the data uploading condition. The following technical solutions can also be performed: generating, in response to that the first service data satisfies the data uploading condition, a fifth updated subscription state indicating that the verification on the topic subscription request succeeds; and transmitting the fifth updated subscription state to the blockchain node to enable the blockchain node to set the fifth updated subscription state for the topic subscription request.

Figure 6A:
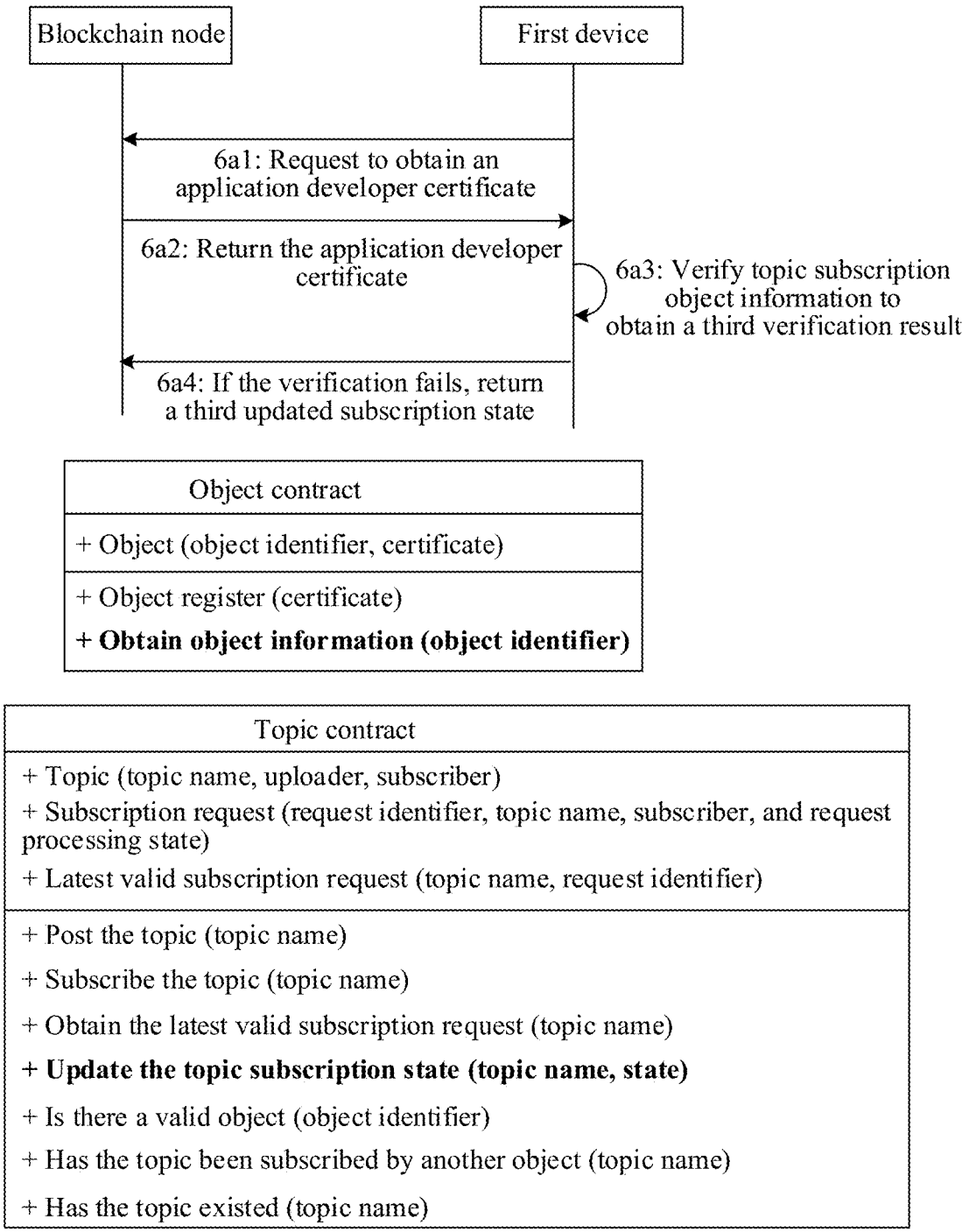
FIG. 6A is a schematic diagram VI of a timing sequence of a data processing method based on blockchain according to an embodiment of this application.

When there is an unprocessed remote certification report, the first device can verify an identity of a subscriber corresponding to the remote certification report to ensure that the subscriber is a partner. FIG. 6A is a schematic diagram VI of a timing sequence of a data processing method based on blockchain according to an embodiment of this application. As shown in FIG. 6A, step 6a1: The first device requests the blockchain node to obtain an application developer certificate. When the first device has not yet cached the application developer certificate of the subscriber, the first device downloads the application developer certificate of the subscriber from the blockchain and caches the application developer certificate of the subscriber. When the application developer certificate of the subscriber has been cached locally, step 6a1 is not executed, and step 6a2 is executed. Step 6a2: The blockchain node returns the application developer certificate to the first device. The blockchain node can call a method of obtaining object information from an object contract according to an object identifier sent by the first device, and then obtain the application developer certificate requested by the first device. Step 6a3: The first device verifies the topic subscription object information to obtain a third verification result. Specifically, the first device compares the application development object information in the application developer certificate with the topic subscription object information in the remote certification report to obtain the third verification result. Step 6a4: When the verification fails, the first device returns a third updated subscription state to the blockchain node. When the verification succeeds, the first device does not execute this step. In this case, the first device executes another verification step, or may return a fifth updated subscription state to the blockchain node.

The second device provides the source code (code) of the data intersection application to the first device. The first device performs manual review. When there are unsafe factors in the source code, such as vulnerabilities or malicious use of data, the subscription state is updated to "The program does not meet an expectation" (the second updated subscription state) and the subsequent process is terminated.

Figure 6B:
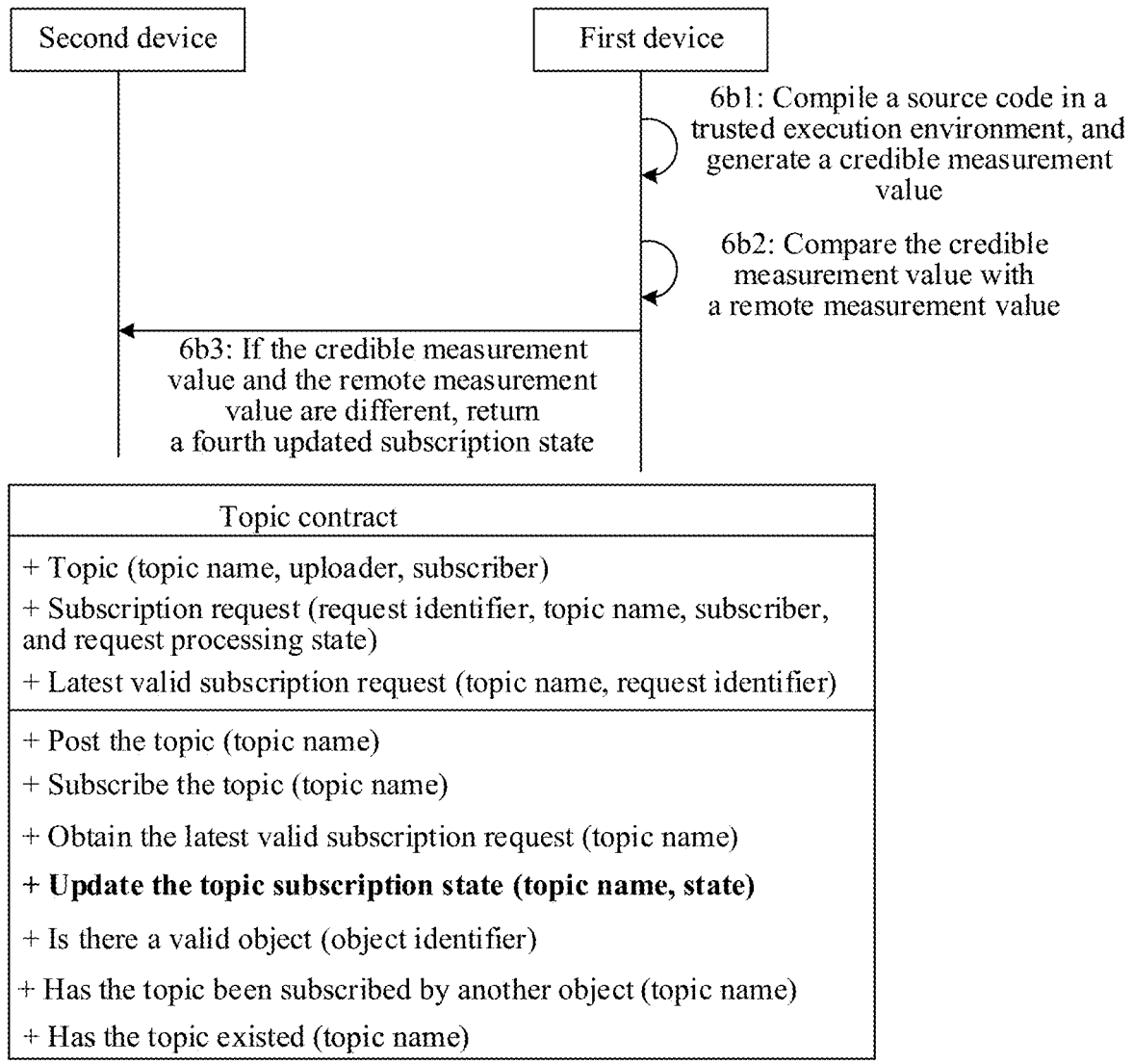
FIG. 6B is a schematic diagram VII of a timing sequence of a data processing method based on blockchain according to an embodiment of this application.

In addition, FIG. 6B is a schematic diagram VII of a timing sequence of a data processing method based on blockchain according to an embodiment of this application. As shown in FIG. 6B, step 6b1: The first device compiles the source code in the trusted execution environment to generate a credible measurement value. Step 6b2: The first device compares the credible measurement value with a remote measurement value. When the credible measurement value and the remote measurement value are the same, the first device returns a fifth updated subscription state or performs the subsequent process. Step 6b3: When the credible measurement value and the remote measurement value are different, the first device returns a fourth updated subscription state. When the credible measurement value and the remote measurement value are inconsistent, it indicates that a review code provided by the second device is inconsistent with a code being run in the TEE of the second device, which poses a potential risk. Therefore, the subscription state is updated to "Audit code is inconsistent with running code", and the subsequent process is terminated.

Figure 6C:
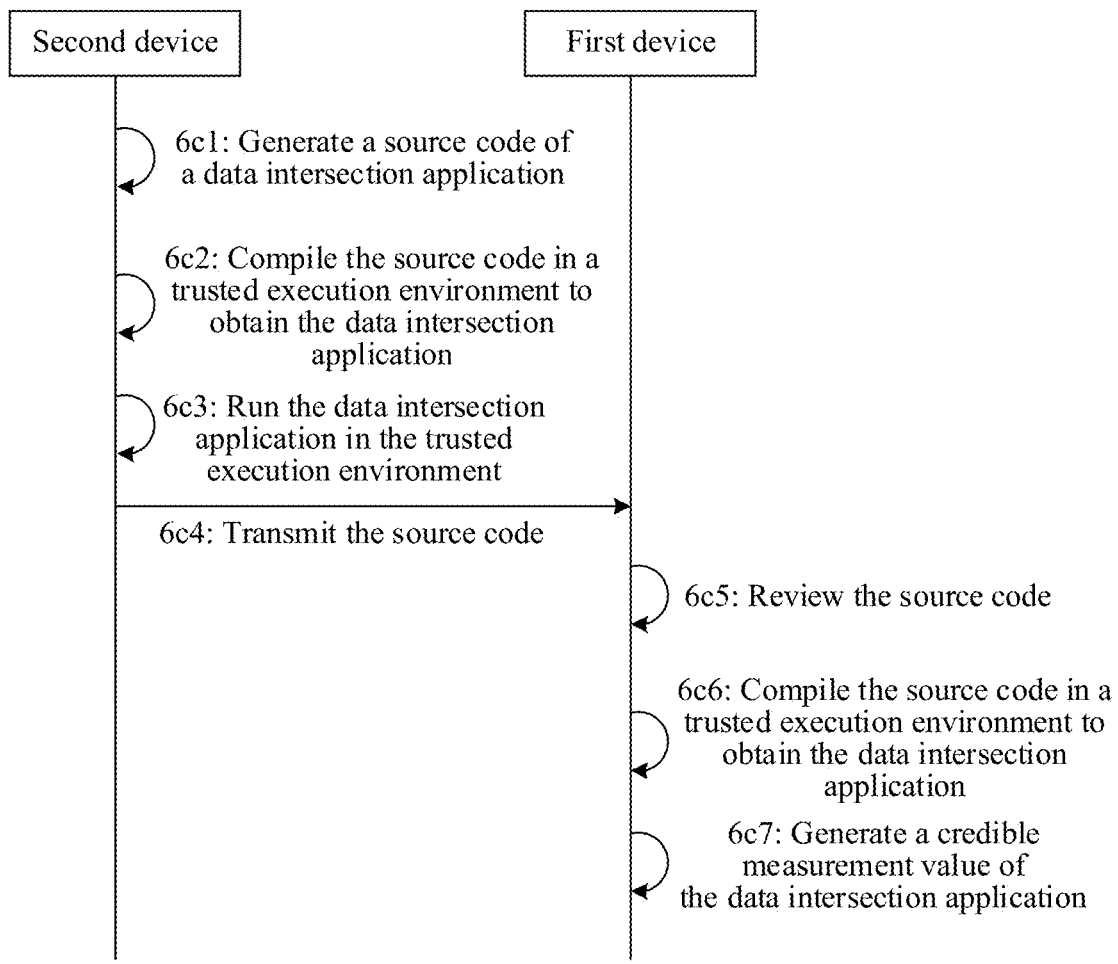
FIG. 6C is a schematic diagram VIII of a timing sequence of a data processing method based on blockchain according to an embodiment of this application.

As can be seen from the above, the verification on the source code includes two aspects: verifying the source code and compiling the source code. FIG. 6C is a schematic diagram VIII of a timing sequence of a data processing method based on blockchain according to an embodiment of this application. As shown in FIG. 6C, step 6c1: The second device generates a source code of a data intersection application. Step 6c2: The second device compiles the source code in a trusted execution environment to obtain the data intersection application. Step 6c3: The second device runs the data intersection application in the trusted execution environment. Step 6c4: The second device transmits the source code to the first device. The embodiments of this application do not limit a source code transmission method which can be P2P transmission between the second device and the first device, or that the second device transmits the source code to the blockchain network and then the first device obtains the source code from the blockchain network. In addition, in a scenario where the second device updates the source code, the second device will transmit the updated source code to the first device again. The embodiments of this application do not limit an order of execution of step 6c4 and step 6c2, and the two steps can be executed simultaneously. Step 6c5: The second device verifies the source code; if the verification fails, sends a second updated subscription state to the blockchain node; and if the verification succeeds, executes step 6c6, and the first device compiles the source code in the trusted execution environment to obtain the data intersection application. Step 6c7: The first device generates a credible measurement value of the data intersection application. The subsequent processes are consistent with those above and will not be described in detail.

When the above certifications (namely, the subscriber certification, the data running environment certification, and the application security certification) all succeed, the first device updates the subscriber in the topic contract and updates the state of the contract subscription request to "Completed" (the fifth updated subscription state). Meanwhile, the first device saves the remote certification result.

According to the embodiments of this application and step S101 in the embodiment corresponding to FIG. 3 above, it can be seen that after obtaining the to-be-processed topic subscription request, the first device may send the remote certification request to the subscriber (namely, the second device) according to the topic subscription request. The remote certification request not only prompts the second device to return the remote certification report, but also prompts the second device to generate the communication key and return the encrypted data key.

The embodiments of this application integrate the blockchain, the trusted execution environment, and the bloom filter technology to provide a software and hardware combination solution for finding intersections for encrypted data. The object information certification is provided through the blockchain to ensure transparent and trustworthy flows. The security of the execution environment and the security of the application program are ensured through remote certification of the TEE. The data can be made available and invisible due to the bloom filter. This solution significantly reduces the temporal and spatial complexity of programs, ensures the security of data in storage, transmission, and operation in the entire life cycle. Common samples of multiple particles can be found out quickly without leaking service data, so that joint service processing can be achieved.

Figure 7:
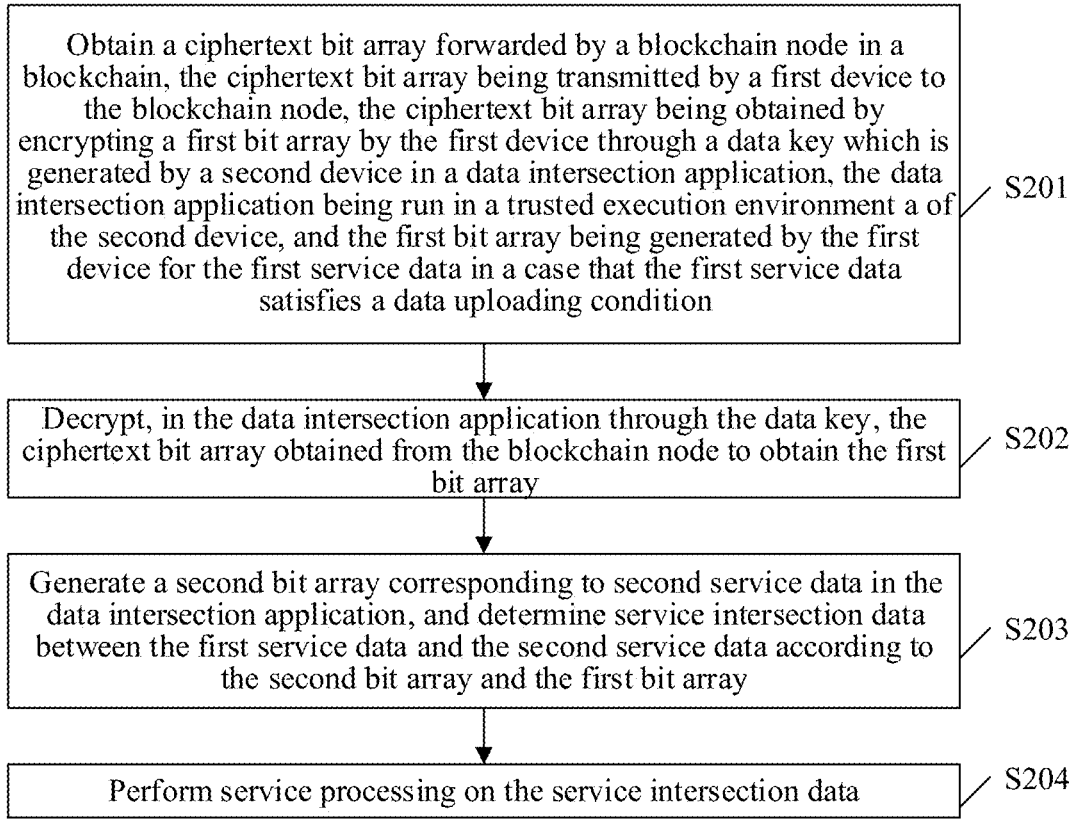
FIG. 7 is a flowchart III of a data processing method based on blockchain according to an embodiment of this application.

FIG. 7 is a flowchart III of a data processing method based on blockchain according to an embodiment of this application. The data processing method based on blockchain may be performed by a first device or a second device, or may be performed by a blockchain node, or may be alternately performed by at least two of the first device, the second device, and the blockchain node. It is not limited here. For the sake of narration and understanding, this embodiment of this application is narrated by being performed by a second device. The second device may be the second device 100b of the foregoing embodiment corresponding to FIG. 1. As shown in FIG. 7, the method may at least include following step S201 to step S204.

Step S201: Obtain a ciphertext bit array forwarded by a blockchain node in the blockchain, the ciphertext bit array being transmitted by a first device to the blockchain node, the ciphertext bit array being obtained by encrypting a first bit array by the first device through a data key, the data key being generated by the second device in a data intersection application, the data intersection application being run in a trusted execution environment a of the second device, and the first bit array being generated by the first device for the first service data in response to that the first service data satisfies a data uploading condition.

In some embodiments, a topic subscription request used for subscribing a topic is generated according to topic subscription object information, the topic being generated by the first device for the first service data; a topic subscription contract of the blockchain node is called on the basis of the topic subscription request; and the topic subscription request is transmitted to the blockchain node through the topic subscription contract to enable the blockchain node to store, in a case of verifying that the topic has a to-be-subscribed attribute through the topic subscription contract and in response to that the topic subscription object information belongs to register object information, the topic subscription request, and to set a request-waiting-for-verification state for the topic subscription request, the request-waiting-for-verification state being used for instructing the blockchain node to forward the topic subscription request to the first device.

In some embodiments, a data downloading request used for obtaining the ciphertext bit array is generated according to topic subscription object information; the data downloading request is transmitted to the blockchain node to enable the blockchain node to inquire a current subscription state corresponding to the topic subscription object information according to the data downloading request; and the ciphertext bit array is obtained, the ciphertext bit array being returned by the blockchain node in a case of determining that the current subscription state is a fifth updated subscription state, the fifth updated subscription state being indicating that the first device succeeds in verification on a topic subscription request, and the topic subscription request being transmitted in response to that the blockchain node stores a topic for the first service data.

Figure 8:
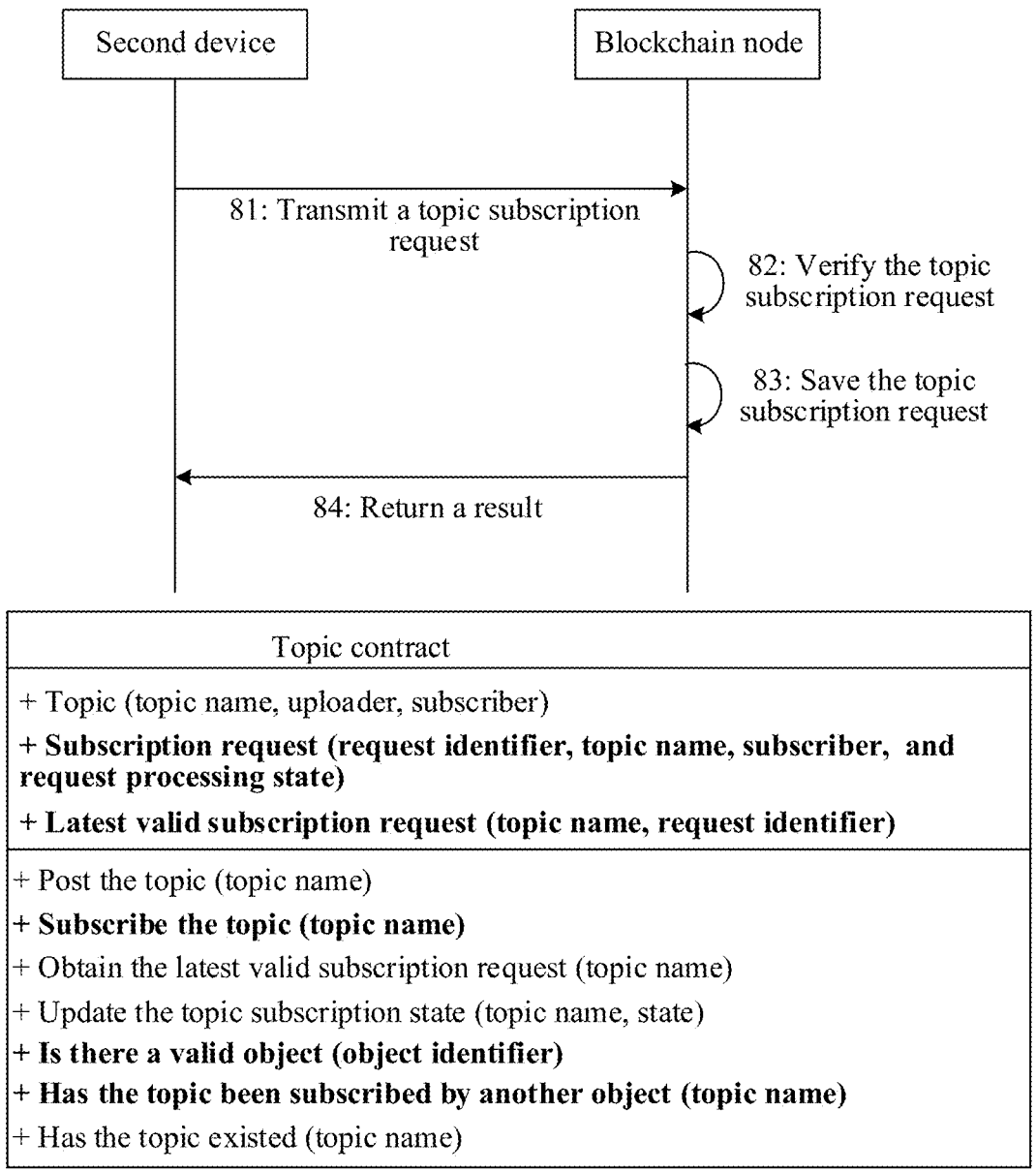
FIG. 8 is a schematic diagram IX of a timing sequence of a data processing method based on blockchain according to an embodiment of this application.

FIG. 8 is a schematic diagram IX of a timing sequence of a data processing method based on blockchain according to an embodiment of this application. As shown in FIG. 8, Step 81: The second device sends the topic subscription request to the blockchain node. The topic subscription request includes the topic subscription object information. Step 82: The blockchain node verifies the topic subscription request. Specifically, the blockchain node may call a topic subscription method (which is equivalent to a topic subscription contract) to ensure, through the topic subscription method, that the topic has not been subscribed by another party (this topic is only subscribed by one party. As a message of the topic is encrypted, and the communication key and the data key cannot be shared among multiple parties, data leakage is prevented), and to also ensure that the subscriber is a registered object on the blockchain. Step 83: The blockchain node saves the topic subscription request. The blockchain node generates a subscription request identifier according to a topic name, a subscriber (namely, the topic subscription object information), a block height, and a transaction index, saves the topic subscription request, and marks, according to the above verification situation, a request processing state of the topic subscription request as "Object not registered/Has been subscribed by another object/To be authorized". If the topic subscription request is valid, a request identifier of the latest valid topic subscription request is updated to the latest subscription request identifier. Step 84: The blockchain node returns a result to the second device. The result can be used for representing a processing result of the blockchain network for the topic subscription request.

Step S202: Decrypt, in the data intersection application through the data key, the ciphertext bit array obtained from the blockchain node to obtain the first bit array.

Figure 9:
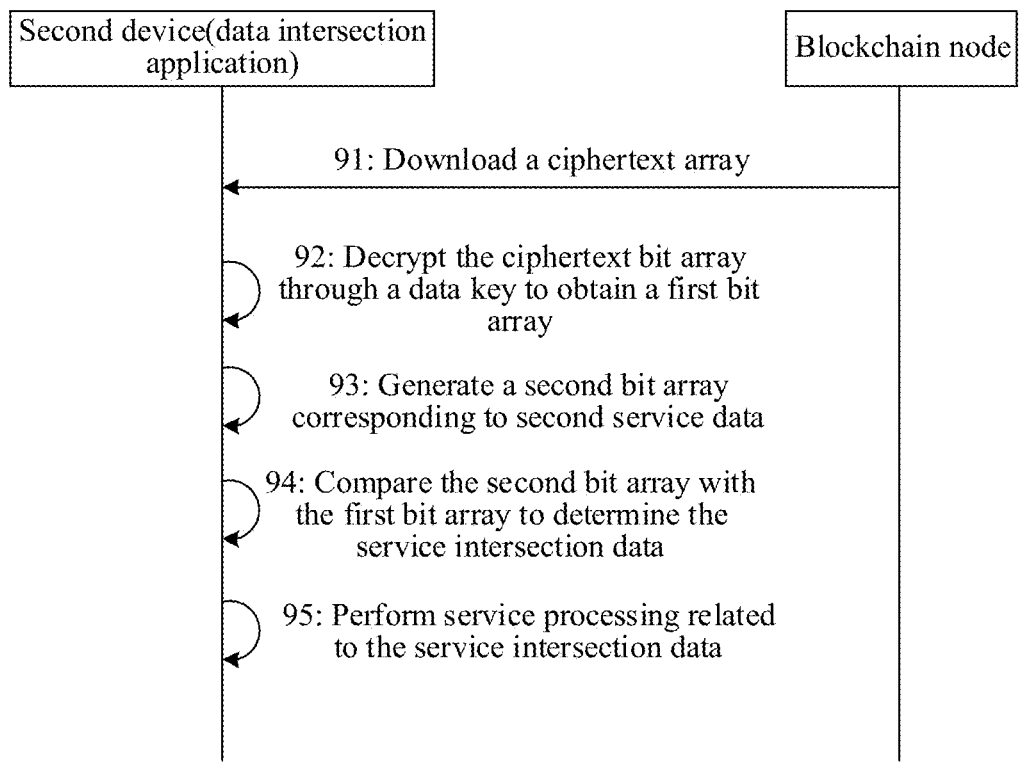
FIG. 9 is a schematic diagram X of a timing sequence of a data processing method based on blockchain according to an embodiment of this application.

FIG. 9 is a schematic diagram X of a timing sequence of a data processing method based on blockchain according to an embodiment of this application. As shown in FIG. 9, step 91: The second device downloads the ciphertext bit array from the blockchain node. Step 92: The second device decrypts the ciphertext bit array through the data key to obtain the first bit array.

Step S203: Generate a second bit array corresponding to second service data in the data intersection application, and determining service intersection data between the first service data and the second service data according to the second bit array and the first bit array.

Specifically, the second service data includes second service data $C_d$; d is a positive integer, and d is less than or equal to a total quantity of the second service data; the second bit array includes a second bit array $E_d$ corresponding to the second service data $C_d$; and in response to that the first bit array includes the second bit array $E_d$, it is determined that the second service data $C_d$ is the service intersection data between the first service data and the second service data.

Referring to FIG. 9 again, step 93: The second device generates a second bit array corresponding to second service data. Specifically, the process that the first device generates the first bit array is the same as the process that the second device generates the second bit array, which will not be described in detail here. Step 94: The second device compares the second bit array with the first bit array to determine the service intersection data. Step 92 to step 94 in FIG. 9 are all executed in a trusted execution environment. The embodiments of this application do not limit a quantity of the second service data, which can be one or more. When there are a plurality of pieces of second service data, the second device traverses each piece of second service data to determine whether a second bit array corresponding to one piece of second service data exists in the first bit array. When a second bit array corresponding to one piece of second service data exists in the first bit array, it is determined that the second service data is the service intersection data. Step 95: The second device performs service processing related to the service intersection data.

As an example, the first service data is a mobile phone number held by the platform application corresponding to the first device. The mobile phone number can be contact information of a silent object of the platform application. The platform application intends to promote the silent object to attract the silent object to remember the platform. Therefore, there are promoters with strong promotion capabilities, but in order to ensure the security of the mobile phone number of the silent object, the first device cannot disclose the mobile phone number to the public. In this case, the first device can use the method provided in this application, which is to first generate a first bit array corresponding to the mobile phone number (namely, the first service data), specifically to store the mobile phone number into a bloom filter. Then, the first device uses a data key generated by the second device in the trusted execution environment to encrypt the bloom filter with the mobile phone number to obtain an encrypted bloom filter. The first device transmits the encrypted bloom filter to the blockchain.

The blockchain first performs relevant verifications on the encrypted bloom filter, and stores the encrypted bloom filter in response to that the verifications succeed. When obtaining a data downloading request sent by the second device, the blockchain first performs the relevant verifications on the second device, and forwards the encrypted bloom filter to the second device in response to that the verifications succeed.

In a data intersection application running in the trusted execution environment, the second device first decrypts the encrypted bloom filter using the data key to obtain the bloom filter (referred to as a first bloom filter for differentiation) with the mobile phone number. The second device then transmits mobile phone numbers held by it to the trusted execution environment, and stores each mobile phone number separately into a bloom filter (referred to as a second bloom filter for differentiation). When the second bloom filter matches the first bloom filter, it is determined that the mobile phone numbers in the second bloom filter belong to the mobile phone number (the service intersection data) jointly held by the promoter and the platform application. Afterwards, the second device pushes an advertisement with a promotional effect provided by the first device to the service intersection data, and the service intersection data belongs to the contact information of the silent object of the platform application.

In order to protect plaintext data (the first service data), the embodiments of this application are combined with Private Set Intersection (PSI), which means that two parties holding data can calculate an intersection part of their data sets without disclosing any data set information beyond the intersection. The PSI usually has three characteristics below:
 (1) Semi-trusted scenario: Both parties of data are unwilling to disclose all the data and only hope to obtain an intersection of data sets.
 (2) Data minimization: Data other than the intersection of the data sets cannot be leaked to any party.
 (3) Secure calculation for both parties: Both parties involved in calculation need to jointly implement a secure computing agreement to ensure data security.

Step S204: Perform service processing on the service intersection data.

Specifically, media data provided by the first device and having an application recommendation function is obtained, and the media data is pushed to the second service data $C_d$.

Since the first service data is stored through the bloom filter, the embodiments of this application can not only protect the privacy of an object, but also reduce the data amount, reduce the number of communications, and reduce the temporal and spatial complexity of the system.

By generating and managing the data key in the TEE, the embodiments of this application can ensure the security of the data key in storage, transmission, and use, thereby ensuring the data security.

By using the blockchain, the embodiments of this application upload the code to the blockchain, which enhances the credibility of the application program. When a data user (namely, the second device) updates the code without the consent of a data provider (namely, the first device), the data provider can stop providing the first service data and upload this process to store changes of service states. In addition, participants (including the data user and the data provider) can provide a basis for subsequent services by uploading services/data provided at each time. In addition, uploading the object identity information can verify the data integrity. Uploading a workflow can ensure flow transparency and facilitate supervision.

In the embodiments of this application, it can be ensured by generating the first bit array corresponding to the first service data that the first service data is available and invisible, so that the security of the first service data can be improved. Further, the data key is generated by the data intersection application in the trusted execution environment a, so that a generation environment is secure, an application environment is secure, and a storage environment is secure. Therefore, encrypting the first bit array through the data key can improve the security of the first bit array. Further, transmitting the ciphertext bit array to the blockchain can accurately trace an obtaining state of the second device for the ciphertext bit array. In addition, the embodiments of this application determine the service intersection data between the first service data and the second service data according to the first bit array and the second bit array corresponding to the second service data, so that the service processing related to the service intersection data can be performed, and the security of the first service data is further improved. According to the above, the adoption of the embodiments of this application can improve the security of data (including the first service data and the first bit array) can be improved, and a data obtaining state can be accurately traced.

Figure 10:
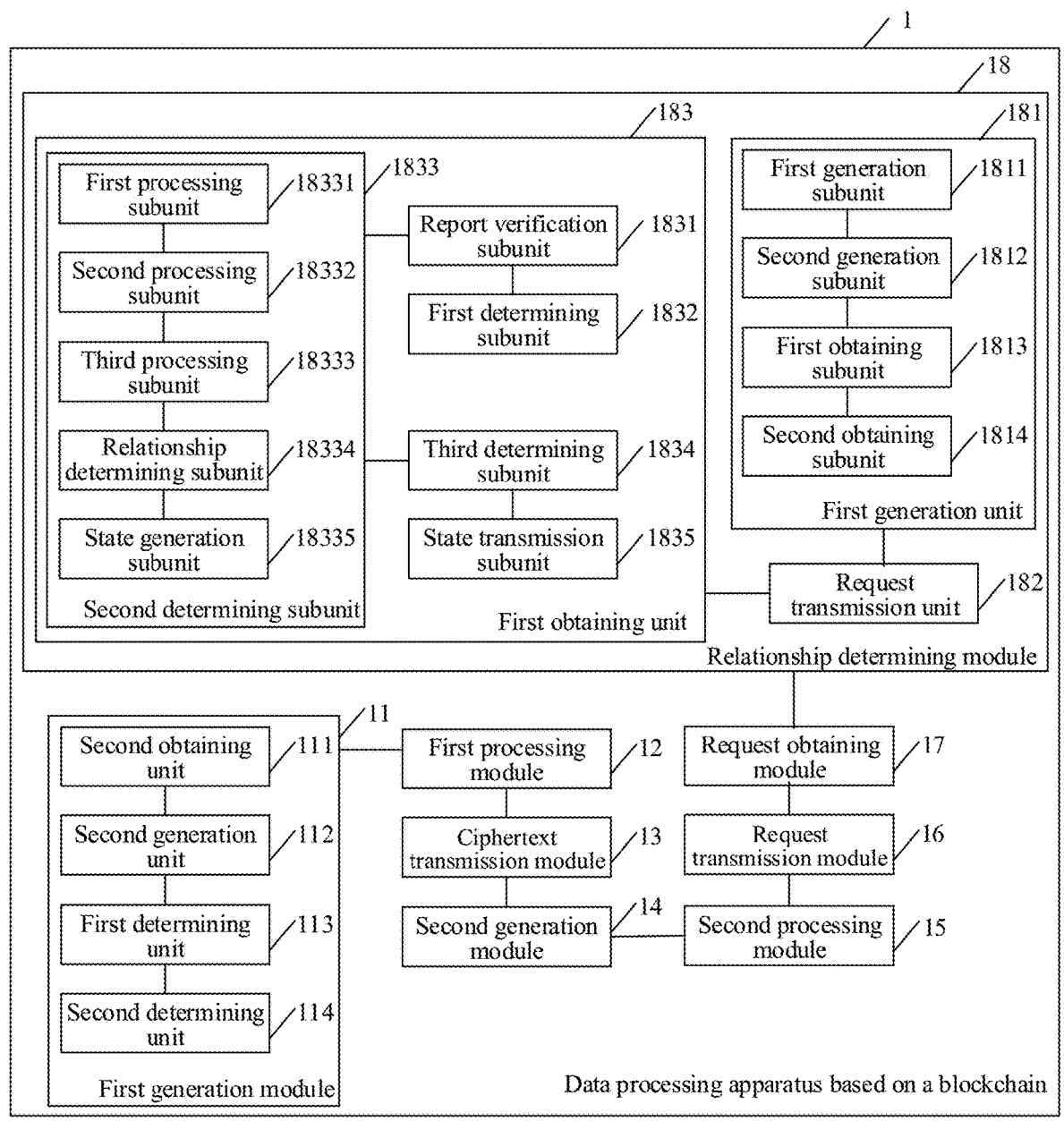
FIG. 10 is a schematic structural diagram I of a data processing apparatus based on blockchain according to an embodiment of this application.

FIG. 10 is a schematic structural diagram I of a data processing apparatus based on blockchain according to an embodiment of this application. The data processing apparatus 1 based on blockchain can be run on a first device, and the data processing apparatus 1 based on blockchain can be configured to execute the corresponding steps in the method provided in the embodiments of this application. As shown in FIG. 10, the data processing apparatus 1 based on blockchain may include: a first generation module 11, a first processing module 12, and a ciphertext transmission module 13. The first generation module 11 is configured to generate, in response to that first service data satisfies a data uploading condition, a first bit array corresponding to the first service data; the first processing module 12 is configured to encrypt the first bit array through a data key to obtain a ciphertext bit array, the data key being generated by a second device in a data intersection application, and the data intersection application being run in a trusted execution environment a of the second device; and the ciphertext transmission module 13 is configured to transmit the ciphertext bit array to a blockchain node in the blockchain to enable the blockchain node to store the ciphertext bit array, the ciphertext bit array stored in the blockchain node being used for being forwarded by the blockchain node to the second device; the second device being configured to decrypt, in the data intersection application through the data key, the ciphertext bit array obtained from the blockchain node to obtain the first bit array; the first bit array being used for instructing the second device to generate second bit array corresponding to second service data in the data intersection application; the second bit array and the first bit array being used for instructing the second device to determine service intersection data between the first service data and the second service data in the data intersection application; and the service intersection data being used for instructing the second device to perform service processing related to the service intersection data.

For specific functional implementations of the first generation module 11, the first processing module 12, and the ciphertext transmission module 13, refer to step S101 to step S103 in the embodiment corresponding to FIG. 3, and details are not described here again.

Referring to FIG. 10, the data processing apparatus 1 based on blockchain may further include: a second processing module 15, a request transmission module 16, a request obtaining module 17, and a relationship determining module 18. The second generation module 14 is configured to: generate a topic for the first service data, and generate a topic posting request including the topic and topic posting object information; the second processing module 15 is configured to: sign the topic posting request through a device private key corresponding to the first device to obtain a signature message z, and call a topic posting contract of a blockchain node on the basis of the topic posting request; the request transmission module 16 is configured to transmit, on the basis of the topic posting contract, the topic posting request carrying the signature message z to the blockchain node to enable the blockchain node to call the topic posting contract in response to that validity verification on the topic posting request succeeds, the topic posting contract being used for instructing the blockchain node to store the topic in a case of verifying that the topic posting object information belongs to register object information and of determining that the topic has a to-be-posted attribute; the topic stored at the blockchain node being used to instruct the second device to transmit a topic subscription request to the blockchain node, the signature message z being used for instructing the blockchain node to perform validity verification on the topic posting request; the request obtaining module 17 is configured to obtain the topic subscription request forwarded by the blockchain node in a case of determining that the topic subscription request has a request-valid attribute; and the relationship determining module 18 is configured to determine a relationship between the first service data and the data uploading condition according to the topic subscription request forwarded by the blockchain node, the relationship between the first service data and the data uploading condition including the first service data satisfying the data uploading condition or the first service data not satisfying the data uploading condition.

For specific functional implementations of the second processing module 15, the request transmission module 16, the request obtaining module 17, and the relationship determining module 18, refer to step S101 in the embodiment corresponding to FIG. 3, and details are not described here again.

Referring to FIG. 10, the relationship determining module 18 may include: a first generation unit 181, a request transmission unit 182, and a first obtaining unit 183. The first generation unit 181 is configured to generate a remote certification request according to the topic subscription request forwarded by the blockchain node; the request transmission unit 182 is configured to transmit the remote certification request to the second device to enable the second device to generate, according to the remote certification request, an intermediate key pair g that includes an intermediate public key f, the intermediate public key f being used for instructing the second device to invoke the trusted execution environment a to generate a remote certification report of the data intersection application; and the first obtaining unit 183 is configured to: obtain the remote certification report returned by the second device, and determine a relationship between the first service data and the data uploading condition according to the remote certification report.

For specific functional implementations of the first generation unit 181, the request transmission unit 182, and the first obtaining unit 183, refer to step S101 in the embodiment corresponding to FIG. 3, and details are not described here again.

Referring to FIG. 10, the first obtaining unit 183 may include: a report verification subunit 1831, a first determining subunit 1832, and a second determining subunit 1833. The report verification subunit 1831 is configured to: call a certification service, and verify the remote certification report through the certification service to obtain a first verification result; the first determining subunit 1832 is configured to determine, in response to that the first verification result indicates that the verification on the remote certification report fails, that the first service data does not satisfy the data uploading condition; and the second determining subunit 1833 is configured to: obtain a source code of the data intersection application in response to that the first verification result indicates that the verification on the remote certification report succeeds, and determine the relationship between the first service data and the data uploading condition according to the source code. The first obtaining unit 183 may further include: a third determining subunit 1834 and a state transmission subunit 1835. The third determining subunit 1834 is configured to determine, in response to that the first verification result indicates that verification on the remote certification report fails, that the trusted execution environment a does not have an environment-secure attribute; and the state transmission subunit 1835 is configured to: generate a first updated subscription state indicating that the trusted execution environment a does not have the environment-secure attribute, and transmit the first updated subscription state to the blockchain node to enable the blockchain node to set the first updated subscription state for the topic subscription request.

For specific functional implementations of the report verification subunit 1831, the first determining subunit 1832, the second determining subunit 1833, the third determining subunit 1834, and the state transmission subunit 1835, refer to step S1013 in the embodiment corresponding to FIG. 5, and details are not described here again.

Referring to FIG. 10, the second determining subunit 1833 may include: a first processing subunit 18331, a second processing subunit 18332, a third processing subunit 18333, and a relationship determining subunit 18334. The first processing subunit 18331 is configured to verify the source code to obtain a second verification result; the second processing subunit 18332 is configured to: obtain, in response to that the second verification result indicates that verification on the source code succeeds, topic subscription object information for the data intersection application from the remote certification report, and verify the topic subscription object information to obtain a third verification result; the third processing subunit 18333 is configured to: obtain a remote measurement value for the source code from the remote certification report, and verify the remote measurement value to obtain a fourth verification result; the relationship determining subunit 18334 is configured to determine the relationship between the first service data and the data uploading condition according to the third verification result and the fourth verification result; and the second processing subunit 18332 is further configured to determine, in response to that the second verification result indicates that the verification on the source code fails, that the first service data does not satisfy the data uploading condition. The second determining subunit 1833 may further include: a state generation subunit 18335. The second processing subunit 18332 is further configured to determine, in response to that the second verification result indicates that the verification on the source code fails, that the source code does not have a code-secure attribute; and the state generation subunit 18335 is configured to: generate a second updated subscription state indicating that the source code does not have the code-secure attribute, and transmit the second updated subscription state to the blockchain node to enable the blockchain node to set the second updated subscription state for the topic subscription request.

For specific functional implementations of the first processing subunit 18331, the second processing subunit 18332, the third processing subunit 18333, the relationship determining subunit 18334, and the state generation subunit 18335, refer to step S1013 in the embodiment corresponding to FIG. 5, and details are not described here again.

Referring to FIG. 10, the second processing subunit 18332 is specifically configured to: obtain an application development object certificate of the data intersection application, obtain application development object information from the application development object certificate, and compare the topic subscription object information with the application development object information; the second processing subunit 18332 is further configured to generate, in response to that the topic subscription object information and the application development object information are different, the third verification result indicating that the verification on the topic subscription object information fails; and the second processing subunit 18332 is further configured to generate, in response to that the topic subscription object information and the application development object information are the same, the third verification result indicating that the verification on the topic subscription object information succeeds. The second processing subunit 18332 is further configured to generate, in response to that the third verification result indicating that the verification on the topic subscription object information fails, a third updated subscription state indicating that the topic subscription object information is unauthorized object information; and the second processing subunit 18332 is further configured to transmit the third updated subscription state to the blockchain node to enable the blockchain node to set the third updated subscription state for the topic subscription request.

For a specific functional implementation of the second processing subunit 18332, refer to step S1013 in the embodiment corresponding to FIG. 5, and details are not described here again.

Referring to FIG. 10, the third processing subunit 18333 is further configured to compile the source code in a trusted execution environment b of the first device to obtain a credible measurement value; the third processing subunit 18333 is further configured to: compare the remote measurement value with the credible measurement value, and generate, in response to that the remote measurement value and the credible measurement value are different, the fourth verification result indicating that the verification on the remote measurement value fails; and the third processing subunit 18333 is further configured to generate, in response to that the remote measurement value and the credible measurement value are the same, the fourth verification result indicating that the verification on the remote measurement value succeeds. The third processing subunit 18333 is further configured to generate, in response to that the fourth verification result indicates that the verification on the remote measurement value fails, a fourth updated subscription state indicating that the source code does not match a running code; and the third processing subunit 18333 is further configured to transmit the fourth updated subscription state to the blockchain node to enable the blockchain node to set the fourth updated subscription state for the topic subscription request.

For a specific functional implementation of the third processing subunit 18333, refer to step S1013 in the embodiment corresponding to FIG. 5, and details are not described here again.

Referring to FIG. 10, the relationship determining subunit 18334 is configured to determine, in response to that the third verification result indicates that the verification on the topic subscription object information succeeds and the fourth verification result indicates that the verification on the remote measurement value succeeds, that the first service data satisfies the data uploading condition; the relationship determining subunit 18334 is further configured to generate, in response to that the first service data satisfies the data uploading condition, a fifth updated subscription state indicating that the verification on the topic subscription request succeeds; and the relationship determining subunit 18334 is further configured to transmit the fifth updated subscription state to the blockchain node to enable the blockchain node to set the fifth updated subscription state for the topic subscription request.

For a specific functional implementation of the relationship determining subunit 18334, refer to step S1013 in the embodiment corresponding to FIG. 5, and details are not described here again.

Referring to FIG. 10, the first generation unit 181 may include: a first generation subunit 1811 and a second generation subunit 1812. The first generation subunit 1811 is configured to generate, according to the topic subscription request forwarded by the blockchain node, a certification challenge random number and an intermediate key pair j including an intermediate private key h and an intermediate public key i; and the second generation subunit 1812 is configured to generate the remote certification request according to the intermediate public key i and the certification challenge random number, the intermediate public key i being used for instructing the second device to generate a communication key according to the intermediate public key i, the certification challenge random number, and an intermediate private key k in the intermediate key pair g, and the communication key being used for encrypting the data key to obtain encrypted data key.

In some embodiments, the first generation unit 181 may include: a first obtaining subunit 1813 and a second obtaining subunit 1814. The first obtaining subunit 1813 is configured to: obtain an intermediate public key f in the remote certification report, and generate the communication key according to the intermediate public key f, the certification challenge random number, and the intermediate private key h; and the second obtaining subunit 1814 is configured to: obtain the encrypted data key returned by the second device, and decrypt the encrypted data key through the communication key to obtain the data key.

For specific functional implementations of the first generation subunit 1811, the second generation subunit 1812, the first obtaining subunit 1813, and the second obtaining subunit 1814, refer to step S101 in the embodiment corresponding to FIG. 3, and details are not described here again.

Referring to FIG. 10, the first generation module 11 may include: a second obtaining unit 111, a second generation unit 112, a first determining unit 113, and a second determining unit 114. The second obtaining unit 111 is configured to: obtain an initial bit array mapped with a first random number, and a random mapping function, and input the first service data to the random mapping function; the second generation unit 112 is configured to generate, through the random mapping function, a second random number corresponding to the first service data, the first random number including the second random number; the first determining unit 113 is configured to determine a to-be-updated bit array (also referred to as a "target bit array" that is to be updated) in the initial bit array, the to-be-updated bit array being mapped with the second random number; and the second determining unit 114 is configured to: update the to-be-updated bit array in the initial bit array, and determine the updated initial bit array to be the first bit array.

For specific functional implementations of the second obtaining unit 111, the second generation unit 112, the first determining unit 113, and the second determining unit 114, refer to step S101 in the embodiment corresponding to FIG. 3, and details are not described here again.

In the embodiments of this application, it can be ensured by generating the first bit array corresponding to the first service data that the first service data is available and invisible, so that the security of the first service data can be improved. Further, the data key is generated by the data intersection application in the trusted execution environment a, so that a generation environment is secure, an application environment is secure, and a storage environment is secure. Therefore, encrypting the first bit array through the data key can improve the security of the first bit array. Further, transmitting the ciphertext bit array to the blockchain can accurately trace an obtaining state of the second device for the ciphertext bit array. In addition, the embodiments of this application determine the service intersection data between the first service data and the second service data according to the first bit array and the second bit array corresponding to the second service data, so that the service processing related to the service intersection data can be performed, and the security of the first service data is further improved. According to the above, the adoption of the embodiments of this application can improve the security of data (including the first service data and the first bit array) can be improved, and a data obtaining state can be accurately traced.

Figure 11:
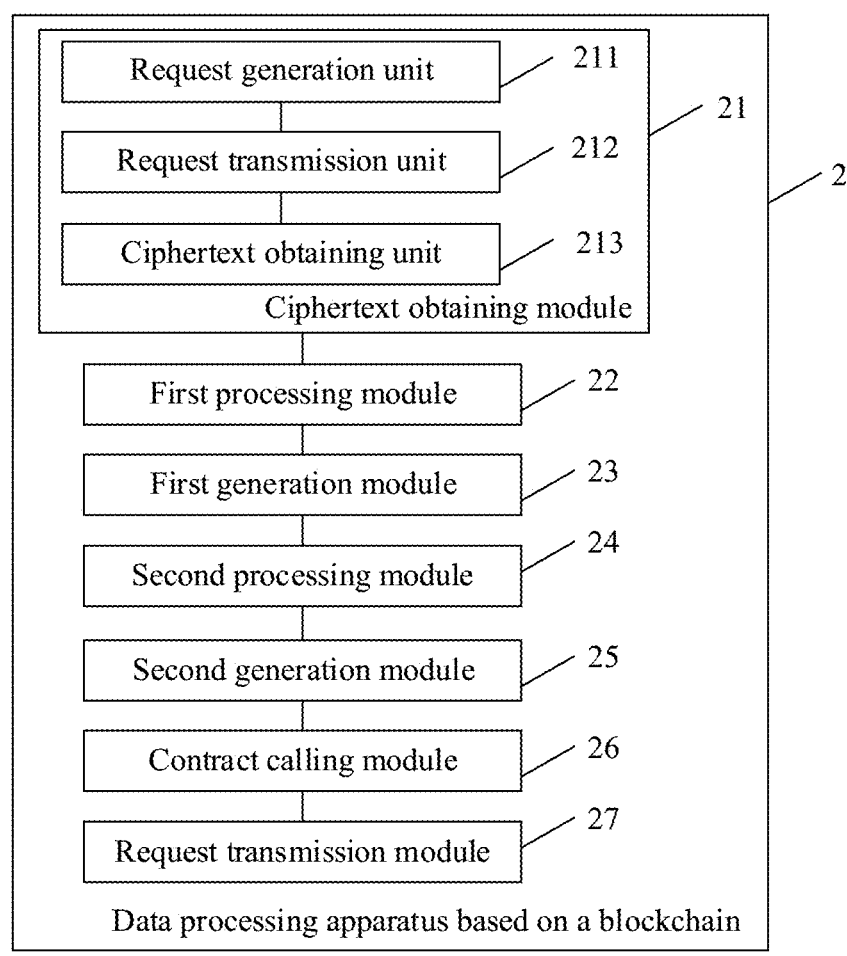
FIG. 11 is a schematic structural diagram II of a data processing apparatus based on blockchain according to an embodiment of this application.

FIG. 11 is a schematic structural diagram II of a data processing apparatus based on blockchain according to an embodiment of this application. The data processing apparatus 2 based on blockchain can be run on a second device, and the apparatus can be configured to execute the corresponding steps in the method provided in the embodiments of this application. As shown in FIG. 11, the data processing apparatus 2 based on blockchain may include: a ciphertext obtaining module 21, a first processing module 22, a first generation module 23, and a second processing module 24. The ciphertext obtaining module 21 is configured to obtain a ciphertext bit array forwarded by a blockchain node in the blockchain, the ciphertext bit array being transmitted by a first device to the blockchain node, the ciphertext bit array being obtained by encrypting a first bit array by the first device through a data key, the data key being generated by the second device in a data intersection application, the data intersection application being run in a trusted execution environment a of the second device, and the first bit array being generated by the first device for the first service data in response to that the first service data satisfies a data uploading condition; the first processing module 22 is configured to decrypt, in the data intersection application through the data key, the ciphertext bit array obtained from the blockchain node to obtain the first bit array; the first generation module 23 is configured to: generate a second bit array corresponding to second service data in the data intersection application, and determine service intersection data between the first service data and the second service data according to the second bit array and the first bit array; and the second processing module 24 is configured to perform service processing on the service intersection data.

For specific functional implementations of the ciphertext obtaining module 21, the first processing module 22, the first generation module 23, and the second processing module 24, refer to step S201 to step S204 in the embodiment corresponding to FIG. 7, and details are not described here again.

Referring to FIG. 11, the ciphertext obtaining module 21 may include: a request generation unit 211, a request transmission unit 212, and a ciphertext obtaining unit 213. The request generation unit 211 is configured to generate, according to topic subscription object information, a data downloading request used for obtaining the ciphertext bit array; the request transmission unit 212 is configured to transmit the data downloading request to the blockchain node to enable the blockchain node to inquire a current subscription state corresponding to the topic subscription object information according to the data downloading request; and the ciphertext obtaining unit 213 is configured to obtain the ciphertext bit array returned by the blockchain node in a case of determining that the current subscription state is a fifth updated subscription state, the fifth updated subscription state being indicating that the first device succeeds in verification on a topic subscription request, and the topic subscription request being transmitted in response to that the blockchain node stores a topic for the first service data.

For specific functional implementations of the request generation unit 211, the request transmission unit 212, and the ciphertext obtaining unit 213, refer to step S201 in the embodiment corresponding to FIG. 7, and details are not described here again.

Referring to FIG. 11, the second service data includes second service data $C_d$; d is a positive integer, and d is less than or equal to a total quantity of the second service data; and the second bit array includes a second bit array $E_d$ corresponding to the second service data $C_d$. The first generation module 23 is further configured to determine, in response to that the first bit array includes the second bit array $E_d$, that the second service data $C_d$ is the service intersection data between the first service data and the second service data; and the second processing module 24 is further configured to: obtain media data provided by the first device and having an application recommendation function, and push the media data to an object characterized by the second service data $C_d$.

For specific functional implementations of the first generation module 23 and the second processing module 24, refer to step S203 to step S204 in the embodiment corresponding to FIG. 7, and details are not described here again.

Referring to FIG. 11, the data processing apparatus 2 based on blockchain may further include: a second generation module 25, a contract calling module 26, and a request transmission module 27. The second generation module 25 is configured to generate, according to the topic subscription object information, a topic subscription request used for subscribing a topic, the topic being generated by the first device for the first service data; the contract calling module 26 is configured to call a topic subscription contract of the blockchain node on the basis of the topic subscription request; and the request transmission module 27 is configured to transmit the topic subscription request to the blockchain node through the topic subscription contract to enable the blockchain node to store, in a case of verifying that the topic has a to-be-subscribed attribute through the topic subscription contract and in response to that the topic subscription object information belongs to register object information, the topic subscription request, and to set a request-waiting-for-verification state for the topic subscription request, the request-waiting-for-verification state being used for instructing the blockchain node to forward the topic subscription request to the first device.

For specific functional implementations of the second generation module 25, the contract calling module 26, and the request transmission module 27, refer to step S201 in the embodiment corresponding to FIG. 7, and details are not described here again.

In the embodiments of this application, it can be ensured by generating the first bit array corresponding to the first service data that the first service data is available and invisible, so that the security of the first service data can be improved. Further, the data key is generated by the data intersection application in the trusted execution environment a, so that a generation environment is secure, an application environment is secure, and a storage environment is secure. Therefore, encrypting the first bit array through the data key can improve the security of the first bit array. Further, transmitting the ciphertext bit array to the blockchain can accurately trace an obtaining state of the second device for the ciphertext bit array. In addition, the embodiments of this application determine the service intersection data between the first service data and the second service data according to the first bit array and the second bit array corresponding to the second service data, so that the service processing related to the service intersection data can be performed, and the security of the first service data is further improved. According to the above, the adoption of the embodiments of this application can improve the security of data (including the first service data and the first bit array) can be improved, and a data obtaining state can be accurately traced.

Figure 12:
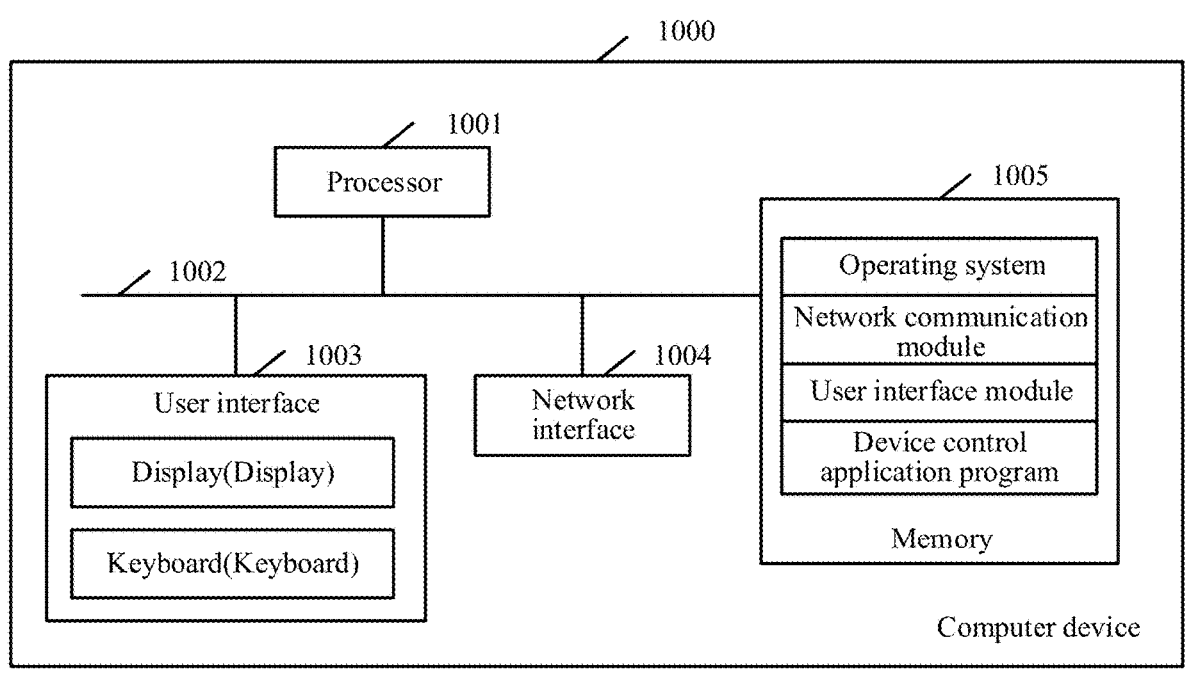
FIG. 12 is a schematic structural diagram of an electronic device according to an embodiment of this application.

FIG. 12 is a schematic structural diagram of an electronic device according to an embodiment of this application. As shown in FIG. 12, the electronic device 1000 may include: at least one processor 1001, for example, a CPU, at least one network interface 1004, a user interface 1003, a memory 1005, and at least one communications bus 1002. The communications bus 1002 is configured to implement connection and communication between these components. In some embodiments, the user interface 1003 may include a display and a keyboard. The network interface 1004 may optionally include a standard wired interface and wireless interface (such as a WI-FI interface). The memory 1005 may be a high-speed RAM memory, or may be a non-volatile memory (non-volatile memory), for example, at least one magnetic disk memory. Optionally, the memory 1005 may be at least one storage apparatus located remotely from the foregoing processor 1001. As shown in FIG. 12, the memory 1005 used as a computer storage medium may include an operating system, a network communications module, a user interface module, and a device-control application program.

In the electronic device 1000 shown in FIG. 12, the network interface 1004 can provide a network communication function. The user interface 1003 is mainly used for providing an inputting port for a user. The processor 1001 may be configured to call a device control application program stored in the memory 1005, and perform the following technical solutions: generating, in response to that first service data satisfies a data uploading condition, a first bit array corresponding to the first service data; encrypting the first bit array through a data key generated by a second device in a data intersection application to obtain a ciphertext bit array, the data intersection application being run in a trusted execution environment a of the second device; and transmitting the ciphertext bit array to a blockchain node in the blockchain to enable the blockchain node to store the ciphertext bit array, the ciphertext bit array stored in the blockchain node being used for being forwarded by the blockchain node to the second device; the second device being configured to decrypt, in the data intersection application through the data key, the ciphertext bit array obtained from the blockchain node to obtain the first bit array; the first bit array being used for instructing the second device to generate second bit array corresponding to second service data in the data intersection application; the second bit array and the first bit array being used for instructing the second device to determine service intersection data between the first service data and the second service data in the data intersection application; and the service intersection data being used for instructing the second device to perform service processing related to the service intersection data.

In some embodiments, the processor 1001 may be configured to call a device control application program stored in the memory 1005, and perform the following technical solutions: obtaining a ciphertext bit array forwarded by a blockchain node in the blockchain, the ciphertext bit array being transmitted by a first device to the blockchain node, and the ciphertext bit array being obtained by encrypting, by the first device, the first bit array through a data key generated by a second device in a data intersection application, the data intersection application being run in a trusted execution environment a of the second device; and the first bit array being generated by the first device for the first service data in response to that the first service data satisfies a data uploading condition; decrypting, in the data intersection application through the data key, the ciphertext bit array obtained from the blockchain node to obtain the first bit array; generating a second bit array corresponding to second service data in the data intersection application, and determining service intersection data between the first service data and the second service data according to the second bit array and the first bit array; and performing service processing on the service intersection data.

It is understood that the electronic device 1000 described in the embodiments of this application can execute the descriptions of the foregoing data processing method or apparatus based on blockchain in the various embodiments, and will not be described here. In addition, the description of beneficial effects of the same method are not described herein again.

The embodiments of this application further provide a computer-readable storage medium. The computer-readable storage medium stores a computer program, and the computer program implements the descriptions of the foregoing data processing method or apparatus based on blockchain in the various embodiments when being executed by a processor. In addition, the description of beneficial effects of the same method are not described herein again.

The above computer-readable storage medium can be an internal storage unit of the data processing apparatus based on blockchain provided by any of the aforementioned embodiments or an internal storage unit of the above electronic device, such as a hard disk or an internal memory of the electronic device. The computer-readable storage medium can also be an external storage device of the electronic device, such as a plug-in hard disk, smart media card (SMC), a secure digital (SD) card, and a flash card, provided on the electronic device. Further, the computer-readable storage medium can also include both the internal storage unit and the external storage device of the electronic device. The computer-readable storage medium can also be configured to store the computer program and other programs and data required by the electronic device. The computer-readable storage medium can also be configured to temporarily store data that has been or is about to be outputted.

The embodiments of this application further provide a computer program product. The computer program product includes a computer program. The computer program is stored in a computer-readable storage medium. A processor of an electronic device reads the computer program from the computer-readable storage medium and executes the computer program, causing the electronic device to perform the foregoing data processing method based on blockchain in the various embodiments. This will not be described here. In addition, the description of beneficial effects of the same method are not described herein again.

The terms such as "first" and "second" in this specification, claims, and the accompanying drawings of the embodiments of this application are used to distinguish different objects and are not used to describe a specific sequence. In addition, the term "include" and any variant thereof are intended to cover a non-exclusive inclusion. For example, a process, method, apparatus, product, or device that includes a series of steps or modules is not limited to the listed steps or modules; and instead, further optionally includes a step or module that is not listed, or further optionally includes another step or unit that is intrinsic to the process, method, apparatus, product, or device.

A person of ordinary skill in the art may understand that, units and algorithm steps of the examples described in the foregoing embodiments disclosed here may be implemented by electronic hardware, computer software, or a combination thereof. To clearly describe the interchangeability between the hardware and the software, the foregoing has generally described compositions and steps of each example based on functions. Whether these functions are implemented as hardware or software depends on particular application and design constraint conditions of the technical solutions. A person skilled in the art may use different methods to implement the described functions for each particular application, but it should not be considered that the implementation goes beyond the scope of this application.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A data processing method performed by a first device, comprising:
    calling a topic posting contract of a blockchain node based on a topic posting request, and transmitting, based on the topic posting contract, the topic posting request to the blockchain node to enable the blockchain node to call the topic posting contract in response to successful validity verification on the topic posting request;
    obtaining a topic subscription request forwarded by the blockchain node in response to the topic subscription request having a request-valid attribute;
    determining a relationship between first service data and a data uploading condition according to the topic subscription request, the relationship between the first service data and the data uploading condition including the first service data satisfying the data uploading condition or the first service data not satisfying the data uploading condition;
    generating, in response to the first service data satisfying the data uploading condition, a first bit array corresponding to the first service data;
    encrypting the first bit array through a data key to obtain a ciphertext bit array, the data key being generated by a second device in a data intersection application run in a trusted execution environment of the second device; and
    transmitting the ciphertext bit array to the blockchain node to enable the blockchain node to store and forward the ciphertext bit array to the second device for the second device to decrypt, in the data intersection application through the data key, the ciphertext bit array to obtain the first bit array.

2. The method according to claim 1, further comprising:
    generating a topic for the first service data;
    generating a topic posting request including the topic and topic posting object information;
    signing the topic posting request through a device private key corresponding to the first device to obtain a signature message;
    wherein the topic posting request carries the signature message.

3. The method according to claim 1, wherein determining the relationship between the first service data and the data uploading includes:
    generating a remote certification request according to the topic subscription request forwarded by the blockchain node;
    transmitting the remote certification request to the second device to enable the second device to generate an intermediate key pair according to the remote certification request; and
    obtaining a remote certification report of the data intersection application returned by the second device, and determining the relationship between the first service data and the data uploading condition according to the remote certification report.

4. The method according to claim 3, wherein:
    the intermediate key pair is a first intermediate key pair including a first intermediate public key and a first intermediate private key; and
    generating the remote certification request includes:
        generating, according to the topic subscription request, a certification challenge random number and a second intermediate key pair including a second intermediate private key and a second intermediate public key; and
        generating the remote certification request according to the second intermediate public key and the certification challenge random number;
    the method further comprising:
        obtaining the first intermediate public key from the remote certification report, and generating a communication key according to the first intermediate public key, the certification challenge random number, and the second intermediate private key; and obtaining an encrypted data key returned by the second device, and decrypting the encrypted data key through the communication key to obtain the data key.

5. The method according to claim 3,
wherein determining the relationship between the first service data and the data uploading condition includes:
calling a certification service, and verifying the remote certification report through the certification service to obtain a verification result;
in response to the verification result indicating that verification on the remote certification report fails, determining that the first service data does not satisfy the data uploading condition; and
in response to the first verification result indicating that the verification on the remote certification report succeeds, obtaining a source code of the data intersection application and determining the relationship between the first service data and the data uploading condition according to the source code;
the method further comprising:
determining, in response to the verification result indicating that the verification on the remote certification report fails, that the trusted execution environment does not have an environment-secure attribute; and
generating an updated subscription state indicating that the trusted execution environment does not have the environment-secure attribute, and transmitting the updated subscription state to the blockchain node to enable the blockchain node to set the updated subscription state for the topic subscription request.

6. The method according to claim 5,
wherein:
the verification result is a first verification result and the updated subscription state is a first updated subscription state; and
determining the relationship between the first service data and the data uploading condition includes:
verifying the source code to obtain a second verification result;
in response to the second verification result indicating that verification on the source code succeeds, obtaining topic subscription object information for the data intersection application from the remote certification report, and verifying the topic subscription object information to obtain a third verification result;
obtaining a remote measurement value for the source code from the remote certification report, and verifying the remote measurement value to obtain a fourth verification result;
determining the relationship between the first service data and the data uploading condition according to the third verification result and the fourth verification result; and
in response to the second verification result indicating that the verification on the source code fails, determining that the first service data does not satisfy the data uploading condition;
the method further comprising:
determining, in response to the second verification result indicating that the verification on the source code fails, that the source code does not have a code-secure attribute; and
generating a second updated subscription state indicating that the source code does not have the code-secure attribute, and transmitting the second updated subscription state to the blockchain node to enable the blockchain node to set the second updated subscription state for the topic subscription request.

7. The method according to claim 6, wherein verifying the topic subscription object information to obtain the third verification result includes:
obtaining an application development object certificate of the data intersection application, and obtaining application development object information from the application development object certificate;
generating, in response to the topic subscription object information and the application development object information being different, the third verification result indicating that the verification on the topic subscription object information fails; and
generating, in response to the topic subscription object information and the application development object information being same, the third verification result indicating that the verification on the topic subscription object information succeeds;
the method further comprising:
generating, in response to the third verification result indicating that the verification on the topic subscription object information fails, a third updated subscription state indicating that the topic subscription object information is unauthorized object information; and
transmitting the third updated subscription state to the blockchain node to enable the blockchain node to set the third updated subscription state for the topic subscription request.

8. The method according to claim 6,
wherein verifying the remote measurement value to obtain the fourth verification result includes:
compiling the source code in a trusted execution environment of the first device to obtain a credible measurement value;
generating, in response to the remote measurement value and the credible measurement value being different, the fourth verification result indicating that the verification on the remote measurement value fails; and
generating, in response to the remote measurement value and the credible measurement value being same, the fourth verification result indicating that the verification on the remote measurement value succeeds;
the method further comprising:
generating, in response to the fourth verification result indicating that the verification on the remote measurement value fails, a third updated subscription state indicating that the source code does not match a running code; and
transmitting the third updated subscription state to the blockchain node to enable the blockchain node to set the third updated subscription state for the topic subscription request.

9. The method according to claim 6, wherein determining the relationship between the first service data and the data uploading condition according to the third verification result and the fourth verification result includes:
determining, in response to the third verification result indicating that the verification on the topic subscription object information succeeds and the fourth verification result indicating that the verification on the remote measurement value succeeds, that the first service data satisfies the data uploading condition;
the method further comprising:

generating, in response to the first service data satisfies the data uploading condition, a third updated subscription state indicating that the verification on the topic subscription request succeeds; and transmitting the third updated subscription state to the blockchain node to enable the blockchain node to set the third updated subscription state for the topic subscription request.

10. The method according to claim 1, wherein generating the first bit array corresponding to the first service data includes:

obtaining an initial bit array mapped with a first random number, and a random mapping function, and inputting the first service data to the random mapping function;

generating, through the random mapping function, a second random number corresponding to the first service data, the first random number including the second random number;

determining a target bit array in the initial bit array, the target bit array being mapped with the second random number; and updating the target bit array to obtain an updated initial bit array, and determining the updated initial bit array to be the first bit array.

11. A non-transitory computer-readable storage medium storing at least one computer program that, when executed by one or more processors, causes the one or more processors to perform the data processing method according to claim 1.

12. An electronic device comprising:

one or more processors; and one or more memories storing at least one computer program;

wherein the electronic device is included in a first device, and the at least one computer program, when executed by the one or more processors, causes the one or more processors to:

call a topic posting contract of a blockchain node based on a topic posting request, and transmitting, based on the topic posting contract, the topic posting request to the blockchain node to enable the blockchain node to call the topic posting contract in response to successful validity verification on the topic posting request;

obtain a topic subscription request forwarded by the blockchain node in response to the topic subscription request having a request-valid attribute;

determine a relationship between first service data and a data uploading condition according to the topic subscription request, the relationship between the first service data and the data uploading condition including the first service data satisfying the data uploading condition or the first service data not satisfying the data uploading condition;

generate, in response to the first service data satisfying the data uploading condition, a first bit array corresponding to the first service data;

encrypt the first bit array through a data key to obtain a ciphertext bit array, the data key being generated by a second device in a data intersection application run in a trusted execution environment of the second device; and transmit the ciphertext bit array to the blockchain node to enable the blockchain node to store and forward the ciphertext bit array to the second device for the second device to decrypt, in the data intersection application through the data key, the ciphertext bit array to obtain the first bit array.

13. The electronic device according to claim 12, wherein the at least one computer program further causes the one or more processors to:

generate a topic for the first service data;

generate a topic posting request including the topic and topic posting object information;

sign the topic posting request through a device private key corresponding to the first device to obtain a signature message;

wherein the topic posting request carries the signature message.

14. The electronic device according to claim 12, wherein the at least one computer program further causes the one or more processors to:

generate a remote certification request according to the topic subscription request forwarded by the blockchain node;

transmit the remote certification request to the second device to enable the second device to generate an intermediate key pair according to the remote certification request; and obtain a remote certification report of the data intersection application returned by the second device, and determining the relationship between the first service data and the data uploading condition according to the remote certification report.

15. A data processing method performed by a second device, comprising:

generating a data key in a data intersection application run in a trusted execution environment of the second device;

generating, according to topic subscription object information, a data downloading request for obtaining a ciphertext bit array, the ciphertext bit array being originated from a first device and forwarded by a blockchain node;

transmitting the data downloading request to the blockchain node to enable the blockchain node to inquire a current subscription state corresponding to the topic subscription object information according to the data downloading request;

obtaining the ciphertext bit array returned by the blockchain node in response to the current subscription state being an updated subscription state, the updated subscription state indicating that the first device succeeds in verification on a topic subscription request, and the topic subscription request being transmitted in response to the blockchain node stores a topic for the first service data;

decrypting, in the data intersection application and through the data key, the ciphertext bit array to obtain a first bit array;

in the data intersection application, generating a second bit array and determining service intersection data between first service data corresponding to the first bit array and second service data corresponding to the second bit array according to the second bit array and the first bit array; and performing service processing on the service intersection data.

16. The method according to claim 15, wherein: determining the service intersection data between the first service data and the second service data includes:

in response to at least portion of the second bit array being also included in the first bit array, determining at least portion of the second service data corresponding to the at least portion of the second bit array as the service intersection data between the first service data and the second service data; and performing the service processing on the service intersection data includes:

obtaining media data provided by the first device and having an application recommendation function, and pushing the media data to an object characterized by the at least portion of the second service data.

17. The method according to claim 15, further comprising:

generating, according to the topic subscription object information, a topic subscription request used for subscribing a topic, the topic being generated by the first device for the first service data;

calling a topic subscription contract of the blockchain node based on the topic subscription request; and transmitting the topic subscription request to the blockchain node through the topic subscription contract.

18. An electronic device comprising:

one or more processors; and one or more memories storing at least one computer program that, when executed by the one or more processors causes the one or more processors to perform the data processing method according to claim 15.

19. A non-transitory computer-readable storage medium storing at least one computer program that, when executed by one or more processors, causes the one or more processors to perform the data processing method according to claim 15.

* * * * *